Oct. 14, 1952     E. J. THURBER     2,613,550
POWER TRANSMISSION MECHANISM
Filed April 30, 1946     7 Sheets-Sheet 1

Inventor
Edward J. Thurber
By
Attorneys.

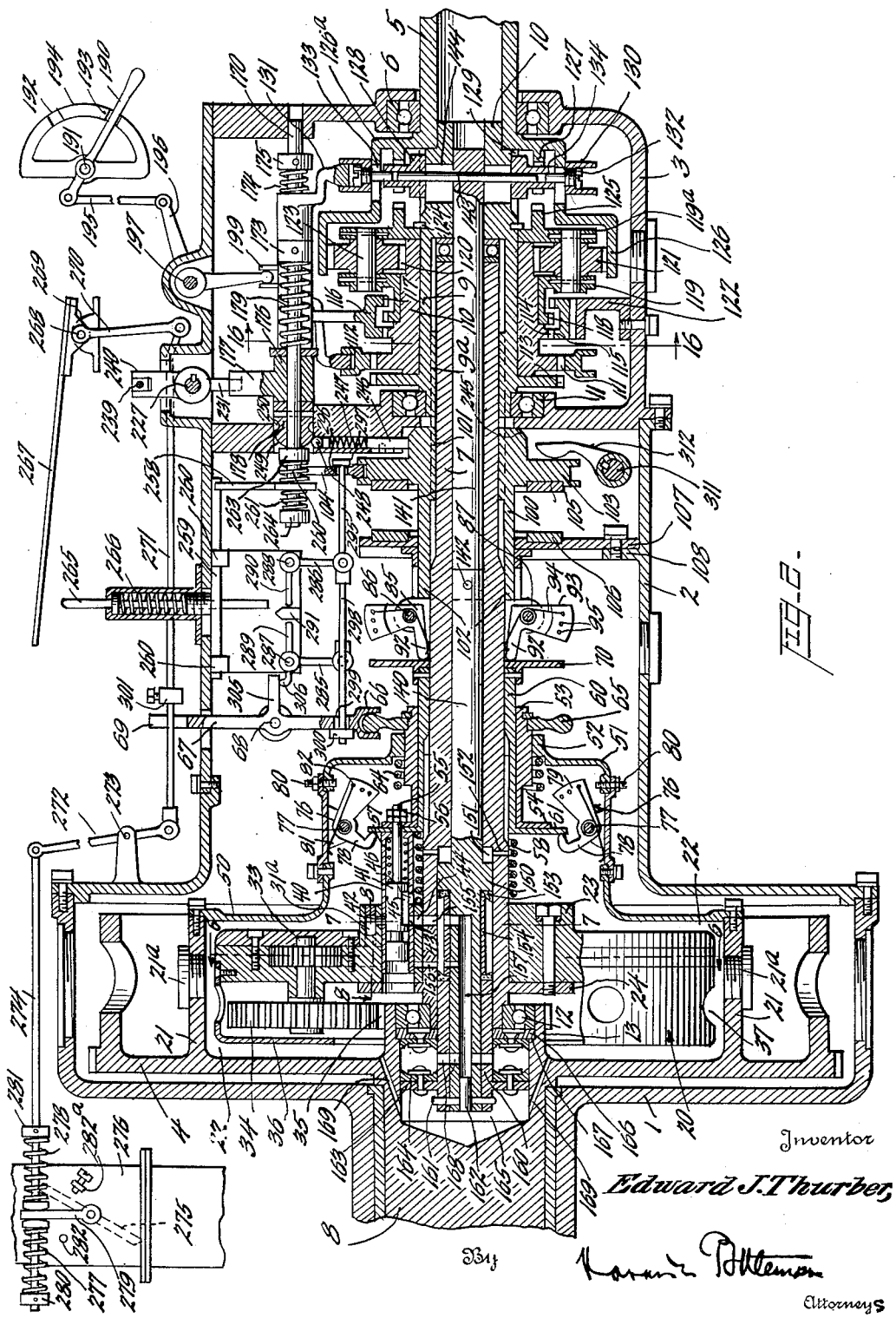

Oct. 14, 1952     E. J. THURBER     2,613,550
POWER TRANSMISSION MECHANISM
Filed April 30, 1946     7 Sheets-Sheet 3
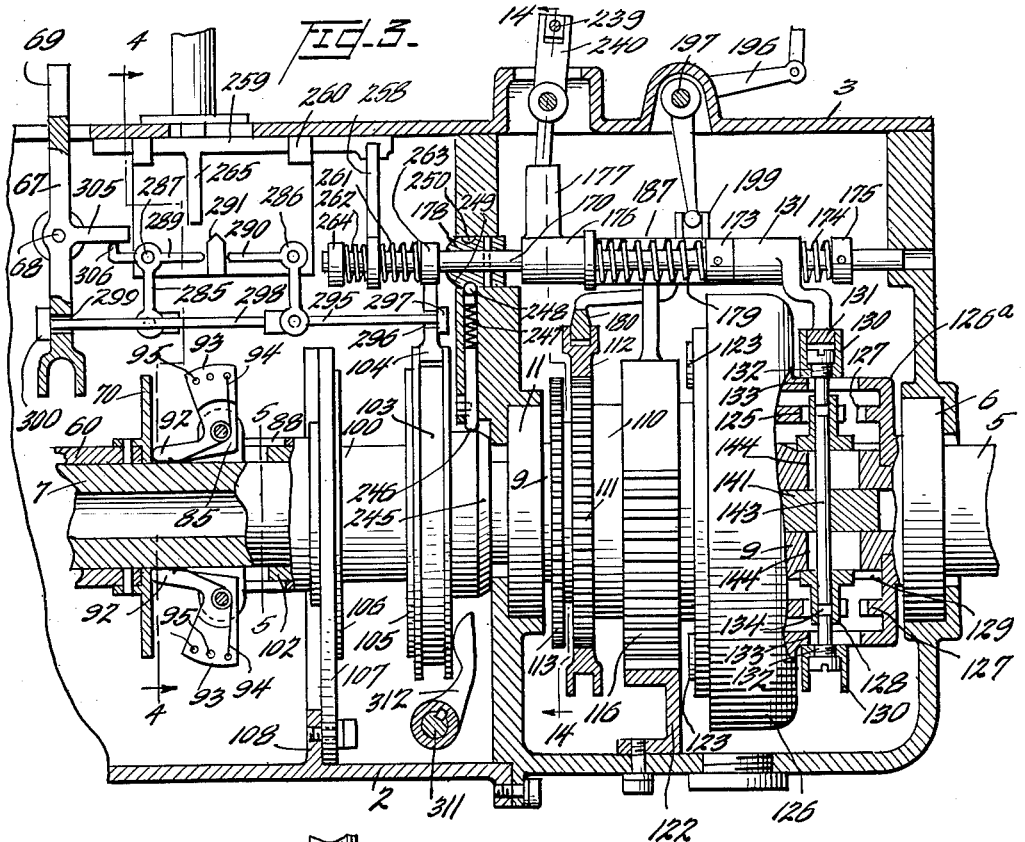
Inventor
Edward J. Thurber,
By
Attorneys Oct. 14, 1952      E. J. THURBER      2,613,550
POWER TRANSMISSION MECHANISM
Filed April 30, 1946      7 Sheets-Sheet 4
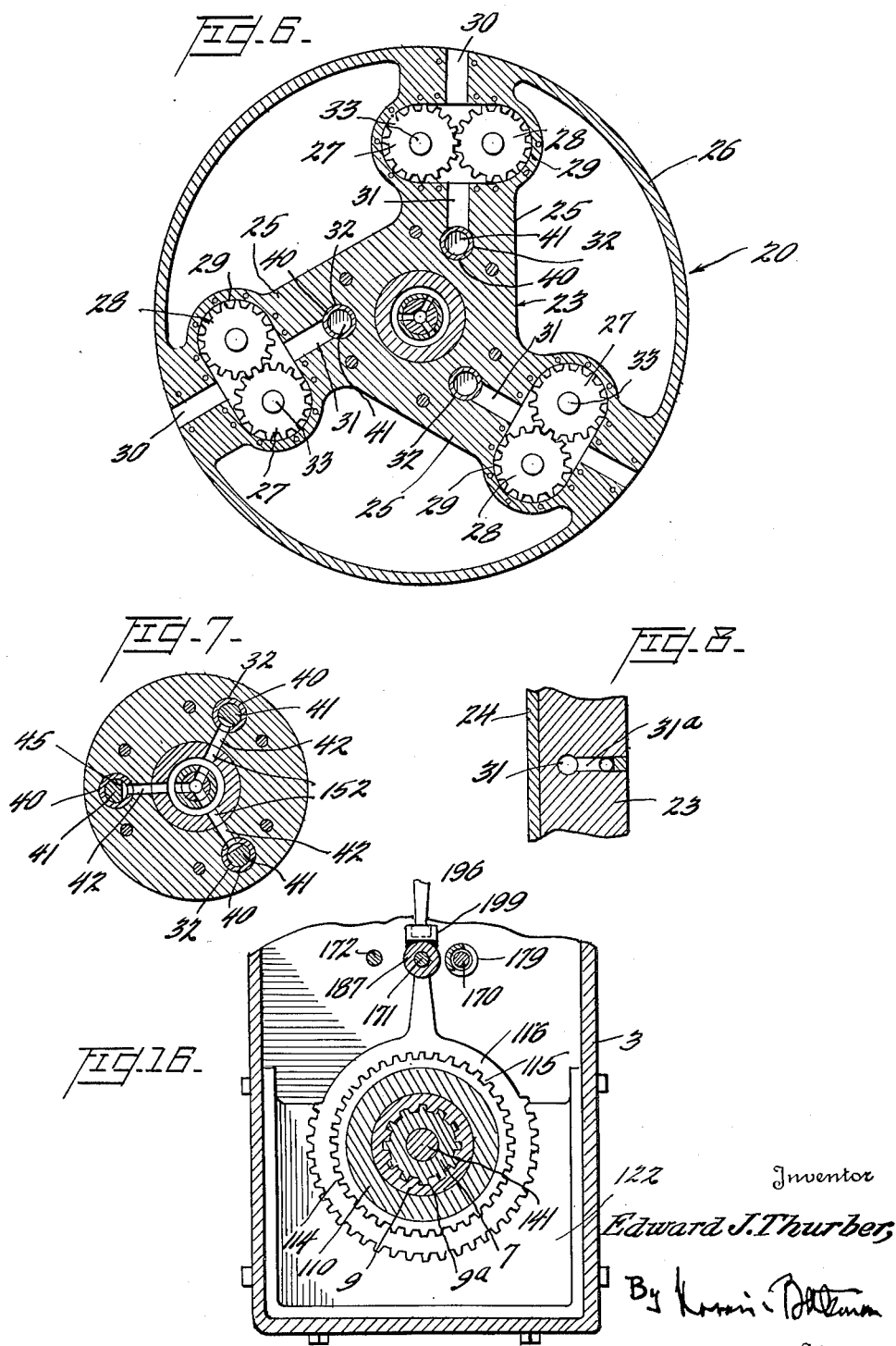

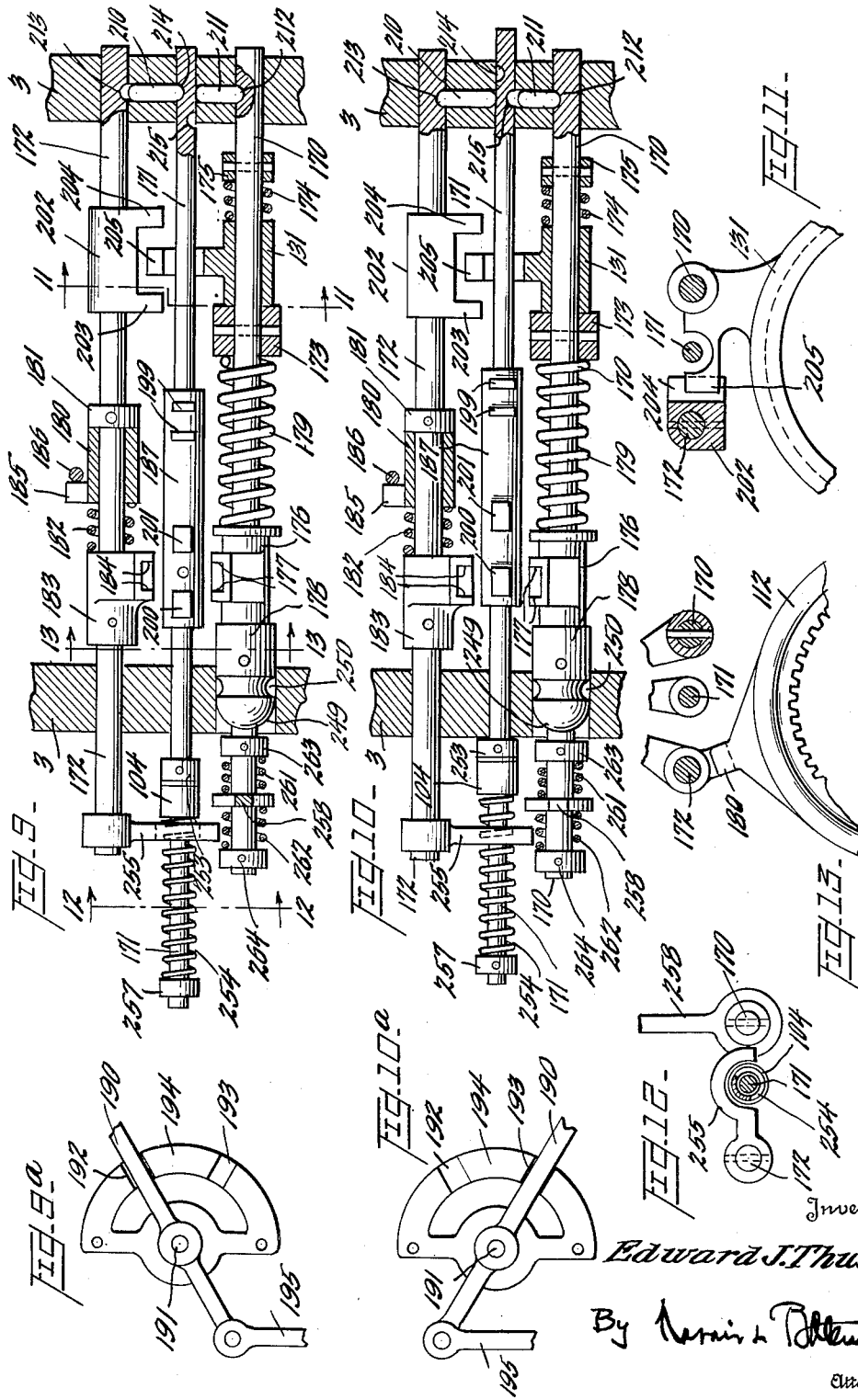

Oct. 14, 1952 — E. J. THURBER — 2,613,550
POWER TRANSMISSION MECHANISM
Filed April 30, 1946 — 7 Sheets-Sheet 6
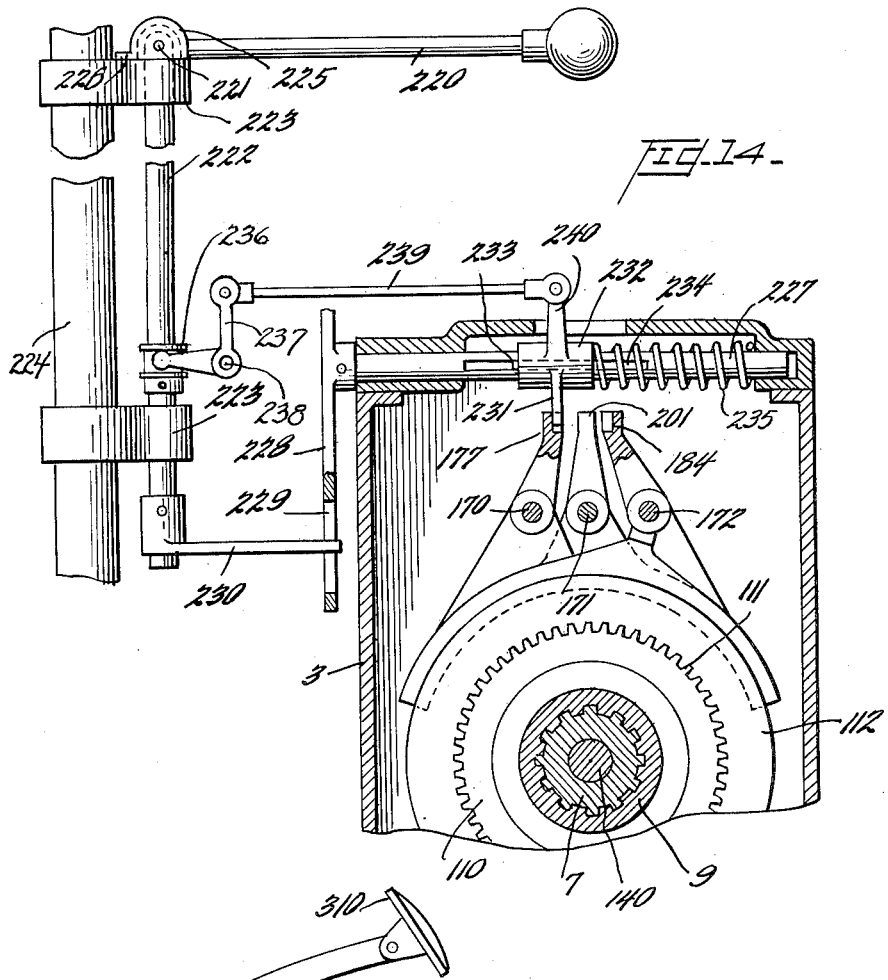
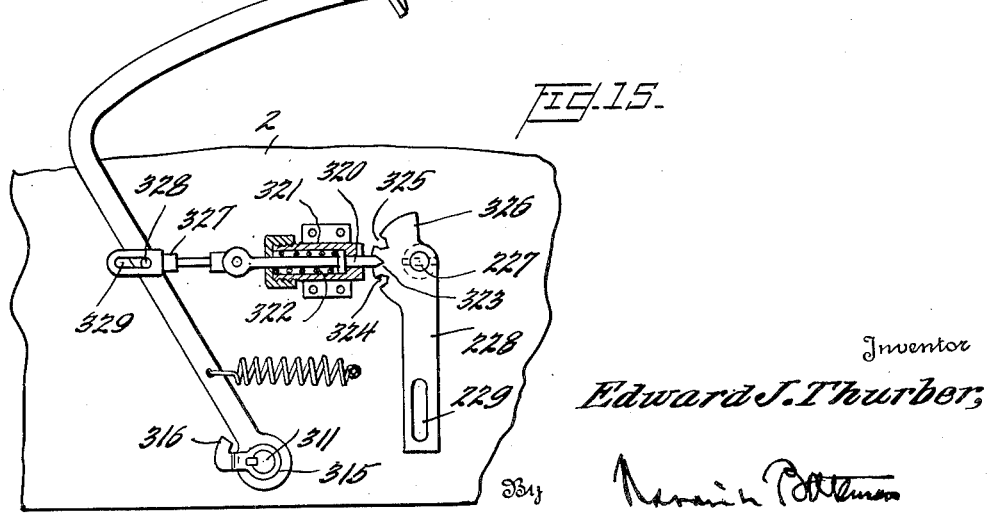
Inventor
Edward J. Thurber

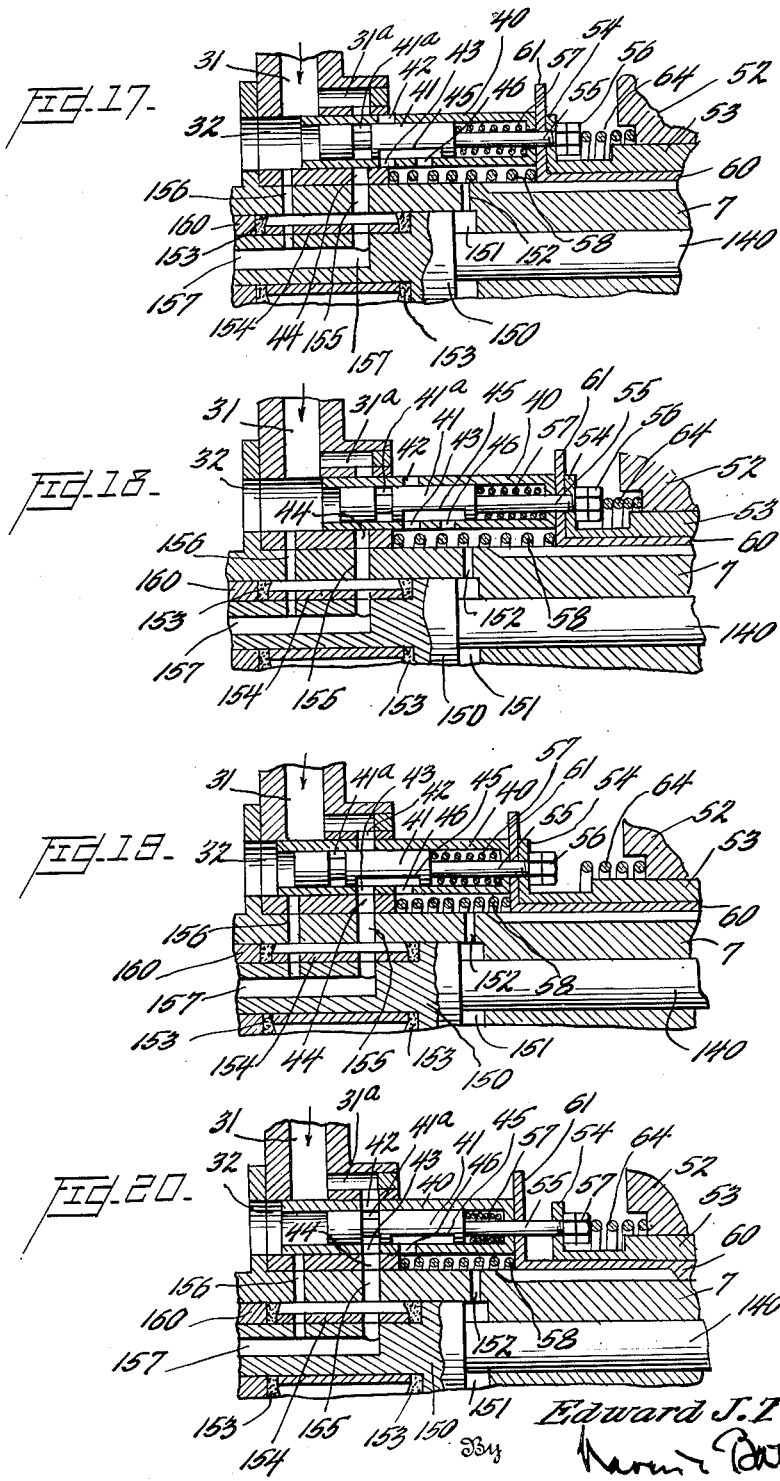

Patented Oct. 14, 1952

2,613,550

UNITED STATES PATENT OFFICE 2,613,550

POWER TRANSMISSION MECHANISM

Edward J. Thurber, New Orleans, La., assignor to The Thurber Corporation, New Orleans, La., a corporation of Louisiana Application April 30, 1946, Serial No. 666,064

59 Claims. (Cl. 74—472)

The present invention relates to improvements in power transmissions adapted to be employed for starting and controlling the operation of machines and mechanisms generally, and is applicable more especially to automobiles, motor boats and other automotive vehicles for providing variable torque and speed transmission from an engine or driving means to the driven mechanism which propels the vehicle.

The invention relates more particularly to power transmissions employing a rotor carrying hydraulic pumps interposed between the driving and driven elements of the transmission and through which torque is transmitted between such elements by controlling the circulation of oil or other suitable fluid through the pumps.

One of the primary objects of the present invention is to provide a novel transmission of this type in which the hydraulic pumps perform the primary function of building up the torque transmitted from the driving to the driven element, and the secondary function of developing pressure in the circulating oil or fluid to provide power for effecting changes in speed ratios between the driving and driven elements.

Another object is to provide a novel arrangement of governors controlled automatically according to the speed of the engine or driving element and the speed of the driven element respectively and which cooperates in starting and gradually increasing the speed of the driven element as the speed of the driving element is increased, until the speed of the driven element has reached or nearly reached the speed of the driving element, whereupon the full torque of the driving element is transmitted to the driven element.

Another object is to provide a transmission embodying novel and improved gearing for driving the driven element at different speed ratios relatively to that of the driving element, and means for changing such gearing automatically, semi-automatically or manually.

Another object is to provide a transmission embodying gearing for changing the speed ratio between the driving and driven elements, and hydraulic means controllable at the will of the operator, for effecting changes through such gearing by power.

Another object is to provide novel and improved control means for a transmission of the type referred to for controlling the sequence of the gear changing operations.

Another object is to provide a novel and improved transmission embodying variable torque transmitting means, a governor responsive to the speed of a driven element of the transmission for controlling the torque transmitting means, and gearing for providing different ratios of speed transmission from the torque transmitting means to the driven element, and means for setting the gearing for different speed ratios and coincidentally setting the governor in a condition to lock the torque transmitting means in a predetermined condition when the gearing is set for one speed ratio and for setting the governor in an unlocked condition when the gearing is set for another speed ratio.

A further object is to provide a novel and improved transmission embodying gearing including a member which is shiftable to set the gearing for transmission of torque at different speed ratios between the driving and driven elements, and a member shiftable in coordination with the shifting of said member of the gearing when the latter is set for one speed ratio to condition the transmission for a change to another speed ratio.

A further object of the invention is to provide a hydraulic power transmission mechanism with circulating fluid to transmit torque from the driving to the driven shaft at infinitely varying speed ratios from zero to direct drive, the hydraulic transmission mechanism operating in conjunction with a gear set having a plurality of forward gear ranges, a reverse and a neutral condition and fluid pressure or manually operable means to select or effect a gear range change in the gear set, valve means operable to control the fluid pressure means to effect a gear range change, controlling means for the valve means controlled conjointly by means responsive to the speed of the driven shaft and modified by means responsive to the throttle controlling position of the accelerator pedal which operates the throttle of the engine.

Another object of the invention is to provide a single planetary gear set with a single ring gear providing a plurality of forward gear ranges, a reverse and a neutral condition.

To these and other ends, the invention consists in certain improvements and combinations and arrangements of parts, all as will be hereinafter more fully described, the features of novelty being pointed out more particularly in the claims at the end of this specification.

In the accompanying drawings:

Figure 2 is a longitudinal section through the transmission shown in Fig. 1, showing the elements in the relative positions they occupy while the transmission is in operation, and set in direct drive.

Figure 3 is a longitudinal section of the right hand end of the transmission shown in Figs. 1 and 2 on an enlarged scale, showing the transmission set in overdrive.

Figure 4 is a transverse section taken on the line 4—4 in Fig. 3.

Figure 5 is a detail cross section taken on the line 5—5 in Fig. 3.

Figure 6 is a transverse section taken on the line 6—6 in Fig. 2.

Figure 7 is a detail section taken on the line 7—7 in Fig. 2.

Figure 8 is a horizontal section taken on the line 8—8 in Fig. 2.

Figure 9 is a horizontal section taken on the line 9—9 in Fig. 1, showing the rails for setting the transmission.

Figure 10 is a view similar to Fig. 9, but showing the controlling rail shifted to set the transmission for direct and overdrive.

Figures 9a and 10a are diagrammatic views showing the positions of the setting member for the controlling rail when set in the positions shown in Fig. 9 and Fig. 10 respectively.

Figure 11 is a transverse section taken on the line 11—11 in Fig. 9.

Figure 12 is a detail section taken on the line 12—12 in Fig. 9.

Figure 13 is a transverse section taken on the line 13—13 in Fig. 9.

Figure 14 is a transverse section taken on the line 14—14 in Fig. 3, and showing the control means on the steering column.

Figure 15 is a side elevation of a portion of the transmission, showing an interlock between the master pedal and the rails which set the gearing for different gear changes.

Figure 16 is a detail transverse section taken on the line 16—16 in Fig. 2.

Figures 17 to 20 are detail longitudinal sections of the torque pump controlling valves and adjacent structure, showing the valves in different positions.

Similar parts are designated by the same reference characters in the several views.

Figure 1:
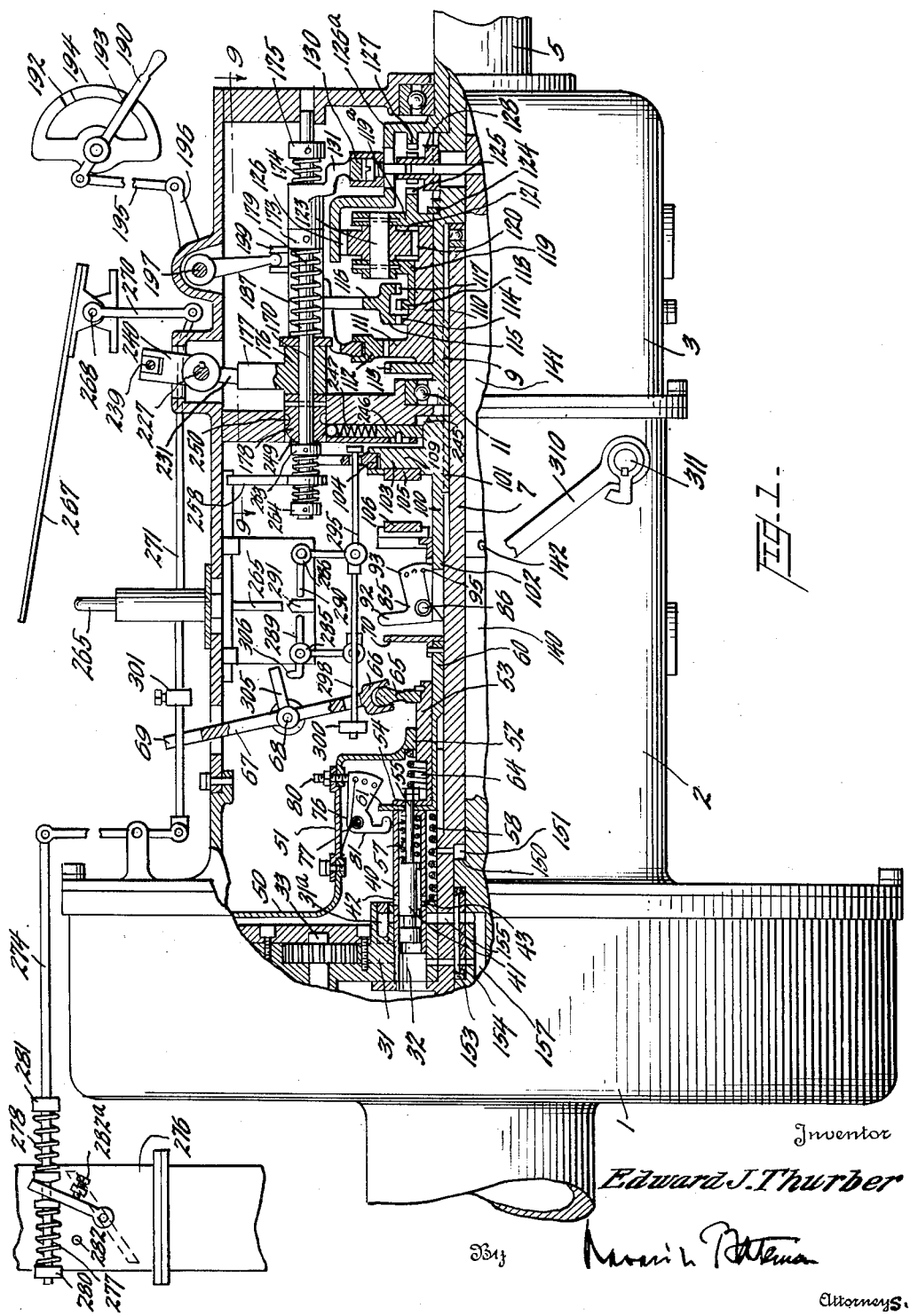
Figure 1 is a side elevation, partly in section, of a power transmission embodying the present invention, the elements of the transmission being shown in neutral position when the controls for the transmission are set for direct or overdrive.

Although the transmission mechanism embodying the present invention is applicable generally to the starting and operation of machinery of various kinds, it is shown in the accompanying drawings and will be hereinafter described in detail as adapted for the control and operation of automobiles and other automotive vehicles. The preferred embodiment of the invention is shown in the present instance and will be hereinafter described, but it is to be understood that the invention is not confined to the precise construction shown and described, as equivalent constructions are contemplated and such will be included within the scope of the claims.

As shown in the present instance, the improved transmission comprises a suitable casing for housing and supporting the various parts of the mechanism, the casing preferably comprising an outer rotor casing section 1, a control casing section 2, and a transmission-gear casing section 3, these sections of the casing being bolted or otherwise secured together rigidly. The casing section 1 is conveniently formed to house the usual flywheel 4 of an automobile engine which in the present instance is the driving element of the transmission, and the casing section 3 has the driven or propeller shaft or element 5 mounted therein through a suitable bearing 6. An intermediate shaft 7 extends between the flywheel or engine crank shaft 8 and the driven or propeller shaft 5, and a main transmission shaft 9 is sleeved over the shaft 7 within the gear casing section 3 and is provided with a pilot 10 which is rotatably fitted in the adjacent end of the driven or propeller shaft 5, the other end of the shaft 9 being rotatably mounted in the casing section 3 by a suitable bearing 11, and this bearing supports the rear or adjacent end of the intermediate shaft 7 which is supported within the main transmission shaft 9 and is splined thereto by the splines 9a. The other or forward end of the intermediate shaft 7 is rotatably mounted in the rear or adjacent end of the flywheel or engine crank shaft 8 by a suitable bearing 12 which is preferably supported within a cylindrical extension 13 from the rear end of the shaft 8.

The intermediate shaft 7 carries a rotor 20 which houses a suitable number of hydraulic torque pumps, the rotor being conveniently housed within the flywheel 4 but is rotatable relatively thereto. Preferably, the flywheel is provided with an annular wall 21 which provides a chamber 22 for the rotor and also a reservoir for the oil or other fluid to be circulated by the pumps, removable plugs 21a being provided for the introduction of the oil or fluid therein. The rotor comprises a hub 23 which is fixed to the intermediate shaft 7 by bolting it to a flange 24 which is formed integrally with said shaft, and a suitable number of circumferentially spaced arms or spokes 25 in which the torque pumps are housed, the outer ends of these arms being preferably connected by a circular ring 26. The pumps are preferably of the gear type, each pump comprising a pair of pump gears 27 and 28 which mesh and are fitted rotatably in a pump chamber 29 formed in the respective arm, each pump chamber having an inlet port 30 leading inwardly from the periphery of the rotor and a discharge or exhaust port 31 leading inwardly from the pump chamber to a valve chamber 32 formed in the hub of the rotor. One of the gears of each pump, such as the gear 27, has a shaft 33 fixed thereto and extending exteriorly of the pump chamber where it is provided with a driving gear 34, and these driving gears for the pumps mesh with a gear 35 fixed to the driving shaft 8, as by forming this gear on the exterior of the cylindrical extension 13 thereon. In order to prevent splashing or churning of oil or fluid in the rotor chamber 22 incident to relative rotation between the rotor and the flywheel and rotation of the gears 34, an annular splash shield 36 is fixed to the periphery of the rotor and has a flange which extends inwardly therefrom and partially houses these gears, the periphery of this shield having openings 37, however, to permit free communication between its interior and the rotor reservoir 22.

Each of the valve chambers 32 contains valves for controlling the circulation of oil or fluid through the respective pump. The valves in each of these chambers comprise an outer valve 40 preferably in the form of a sleeve which is fitted to reciprocate within the respective valve chamber, and an inner valve 41 which is reciprocable within the valve 40. Each valve chamber 32 is open to the space in which the gears 34 operate, and the adjacent end of the outer sleeve valve 40 is also open thereto. The valve 40 is provided with lateral ports 42 and 43 which are movable, by reciprocation of said valve, into and out of communication with an axial extension 31a of the discharge port 31 and with a port 44 formed radially in the rotor hub 23 and the adjacent portion of the intermediate shaft 7, for a purpose which will hereinafter appear. The inner valve 41 fits closely and is reciprocable in the valve 40 and controls the port 42 in the latter valve, and the inner valve is provided with a port 45 in a side thereof to control communication between the port 44 and a vent port 46 in the valve 40.

The rotor reservoir 22 is closed at its rear side by a casing section 50, the periphery of which is bolted or otherwise secured to the annular wall 21 and has a rearwardly extending hub portion 51 which is provided with a bearing 52 in which a sleeve 53 is slidable axially. The inner end of this sleeve is formed with a flange 54 through which stems 55 on the inner valves 41 extend, these stems at the rear side of the flange 54 having nuts 56 or other suitable adjustable abutments fixed thereon, these abutments being held yieldingly against the rear side of said flange by springs 57, one encircling each of the inner valve stems 55. A second sleeve 60 extends slidably through the sleeve 53 and is splined on the intermediate shaft 7, the forward end of this inner sleeve having a flange 61 thereon against which the flange 54 on the outer sleeve is held yieldingly by the springs 57, and the rear ends of the outer valves 40 are held against the flange 61 for movement therewith by the springs 57. A spring 58 acting on the sleeve 60 tends to open the valves, and a stop spring 64 is provided for limiting the extent of opening thereof. The combined strength of the springs 57 is greater than the strength of the spring 64, and the spring 64 is stronger than the spring 58.

The sleeve 53 exteriorly of the rotor casing carries a collar 65 with which a yoke 66 cooperates for shifting this sleeve axially, said yoke being formed preferably on the inner end of a lever 67 which is pivoted within the casing section 2 for rocking movement on a pivot 68, this lever extending to the outside of this casing section where it is provided with a fork 69 for actuating it in a manner hereinafter described. The sleeve 60 also has a collar or flange 70 fixed to the end thereof exteriorly of the rotor casing.

The rotor casing section 50, which rotates with and at the same speed as that of the engine or driving shaft 8, has a governor mounted therein. This governor comprises preferably a pair of centrifugal governor members 76 each of which is pivoted within the casing section 50 at 77 and has a finger 78 which engages the forward side of the flange 61 on the inner sleeve 60, and a weighted end 79 which tends to swing outwardly under centrifugal force incident to rotation of the rotor casing. A set screw or other suitable exteriorly adjustable stop 80 is provided in the rotor casing for limiting the outward swing of each governor member, and a spring 81 is provided for each governor member, this spring acting to swing the respective governor member outwardly against its stop. The power of each of these springs may be adjusted by inserting an end thereof into one or another of a series of holes 82 formed in the weighted end of the respective governor member.

A second or master governor cooperates with the flange 70 fixed to the inner sleeve 60, this governor comprising preferably a suitable number of centrifugal governor members 85, two of these governor members being shown in the present instance. These governor members are rotatably mounted on pivots 86 supported by forks 87 formed on a collar 88 which is fitted around the intermediate shaft 7 and is fixed thereto by screws 89 or other suitable means, spacers 89a being interposed between said shaft and opposite sides of the collar and through which the screws extend to provide spaces 90 at those sides of the collar where the governor members are mounted, and these sides of the collar are slotted, as at 91 to permit the governor members to operate therein. Each of the governor members comprises an arm 92 adapted to cooperate with the flange 70, and a weighted arm 93 which is movable outwardly under centrifugal force against the action of a spring 94, and the strength of this spring may be adjusted by inserting an end thereof into one or another of a series of holes 95 in the weighted arm. These springs will hold the governor members in the retracted position shown in Fig. 1 while the intermediate shaft is not rotating, and centrifugal force will swing these governor members outwardly toward or to the position shown in Fig. 2 during rotation of said shaft, causing the arms 92 of the governor members to act on the flange 70 to shift the valves 40 and 41 from the position shown in Fig. 1 toward or to the position shown in Fig. 2, according to the speed of rotation of the intermediate shaft 7.

Means is provided, however, for overriding the master governor when desired, such means as shown in the present instance comprising a sleeve 100 which is slidable axially on the shaft 7 and is splined to rotate therewith by the splines 101, this sleeve having a pair of segmental extensions 102 thereon which are movable in the spaces 90 in the collar 88 and engageable with the heels of the governor members 85; movement of the sleeve 100 toward the left from the position shown in Fig. 2 causing the weighted ends of the governor members to swing inwardly against the action of centrifugal force and to cause the arms 92 thereof to recede from the flange 70, thereby permitting the valves 40 and 41 to move from the position shown in Fig. 2 to or toward the position shown in Fig. 1 under the action of the main valve retracting spring 58. The sleeve 100 is provided with a collar or flange 103 which is fixed thereto and formed with a peripheral groove to receive the inner end of a shifting arm 104 which is controlled and operated in a manner hereinafter described. In order to stop rotation of the rotor or hold the rotor from rotation while the main or master governor acts to hold the valves 40 and 41 in retracted position, the sleeve 100 operates a brake which comprises in the present instance a friction brake ring 105 of suitable material which is fixed in a face thereof and arranged to engage a similar brake ring 106 which is fixed in an opposing face of a brake disk 107, the latter being fixed non-rotatably in the casing section 2, as by bolting it to a flange 108 formed therein, the shaft 7 and sleeve 100 extending freely through this brake disk.

The transmission provided by the present invention combines therewith novel gearing contained in the casing section 3 which enables the ratio of speed transmission between the rotor and the driven or propeller shaft 5 to be changed to provide a direct drive between these elements and to provide an overdrive or higher ratio of speed of the driven or propeller shaft 5 relatively to that of the rotor, and to also provide a reverse drive between these elements. This gearing comprises in the present instance a sleeve 110 which is mounted rotatably on the main transmission shaft 9. This sleeve is formed with a circular series of clutch teeth 111 with which a clutch ring 112 engages, and the main transmission shaft 9 is provided with a similar series of clutch teeth 113 with which the clutch ring 112 is engageable simultaneously with its engagement with the clutch teeth 111 when the clutch ring is shifted axially toward the left from the position shown in Figs. 1, 2 and 3, thus coupling the sleeve 110 and main shaft 9 together. The sleeve 110 is also formed with a series of brake teeth 114 with which a complemental set of teeth 115 on a brake ring 116 are engageable, as shown in Figs. 1 and 2. The brake ring 116 also has a second series of brake teeth 117 thereon which are engageable with a complemental series of brake teeth 118 formed on a pinion carrier member 119 when the brake ring 116 is shifted toward the left from the position shown in Figs. 1 and 2 to disengage the teeth 115 thereon from the brake teeth 114. The brake ring 116 is shiftable axially but is held from rotations in the casing section 3, as by splining it to an anchor 122 bolted or fixed in this casing section. The sleeve 110 is further provided with a sun gear 120 with which a suitable number of planetary pinions 121 mesh, these pinions being carried by the member 119 and a companion member 119a, these pinion carrier members being rigidly connected by the pinion shafts 123. The sleeve 110 is confined from axial displacement by abutting at one end against the flange on the shaft 9 on which the clutch teeth 113 are formed, and abutting at its opposite end against the pinion carrier member 119a which preferably is mounted rotatably on the main transmission shaft 9 and is retained from axial displacement thereon by a retaining ring 124 which may be inserted in a groove around the shaft 9. This pinion carrier member 119a is also provided on its rear face with a set of clutch teeth 125. The pinions 121 mesh with an internal gear 126 which is fixed to the driven shaft 5, preferably by forming it integrally therewith, and this gear is provided on the face thereof opposite to the clutch teeth 125 with a set of clutch teeth 127. A clutch member 128 is mounted between the pinion carrier member 119a and the internal gear 126, this clutch member being slidable on the main transmission shaft 9 but connected to rotate therewith by splines 129, and this slidable clutch member is provided on its opposite sides with clutch teeth which are complemental to and engageable with the clutch teeth 125 on the pinion carrier member 119a or with the clutch teeth 127 on the internal gear 126 when this clutch member is shifted axially in one or the other direction. The clutch member 128 is shown in its neutral position in Fig. 1, in its direct drive position in Fig. 2, and in its overdrive position in Fig. 3.

Means is provided for setting the clutch member 128 for operation by power and for operating it manually. As shown in the present instance, this clutch member, which is housed within the hub 126a of the internal gear 126, is provided with a peripherally grooved shifting collar 130 mounted on the gear hub 126a to shift axially thereon, and a shifting fork 131 which cooperates therewith, with screws 132 extending inwardly through the collar 130 and through slots 133 in the internal gear and engaging in an annular groove 134 in the periphery of member 128, whereby movement of the collar 130 axially will shift the clutch member 128 correspondingly.

The power means for shifting the clutch member 128 derives its power from the torque pumps and associated spring means, and comprises in the present instance a shaft preferably composed of two sections 140 and 141 which may be inserted into the respective ends of the hollow intermediate shaft 7 and connected at their inner ends by a pin 142 which is preferably located to aline with the screws 89, as shown in Fig. 5, so that these screws, while in place, will retain this pin in operative position, although when these screws are removed, the pin may be removed to disconnect the shaft sections 140 and 141 and thereby enable the gear casing 3 and the gearing therein to be removed from the remainder of the transmission shaft 7 should such become necessary for any purpose. The end of the shaft section 141 adjacent to the clutch member 128 has a pin 143 extending diametrically therethrough, and this pin extends through diametrically disposed slots 144 in the adjacent portion of the main transmission shaft 9, and the ends of this pin extend into the holes 134 in the clutch member 128, thereby coupling the latter to the shaft section 141 for axial shifting movement thereby when said shaft section and the shaft section 140 connected thereto are shifted axially in the intermediate shaft 7. This pin 143 is retained in position by the screws 132 while they are in place, but may be removed, should such become necessary, by removing these screws.

The forward end of the inner shaft section 140 is preferably formed with an enlarged cylindrical collar 150 which is fitted to reciprocate in a cylindrical chamber 151 formed in the adjacent end of the intermediate shaft 7, vent holes 152 being provided which extend from this chamber at one side of the collar to the exterior of the shaft 7, and a pair of packing rings 153 are provided at the other side of the collar and are retained in place by a retainer band 154. The space between the packing rings provides a chamber which communicates with a port 155 which registers with the port 44 in the hub of the rotor, and with a port 156 in the shaft 7 which extends through the adjacent portion of the hub of the rotor and into the respective valve chamber 32, and continuations of these ports through the retainer band 154 communicate with an axial passage 157 formed centrally in the shaft section 140.

A sleeve 160 is fitted over the outer end of the shaft section 140 and is fixed thereto by a pair of pins 161, and the outer end of the passage 157 is closed by a suitable plug 162. The sleeve 160 carries a piston 163 and a suitable packing 164 thereon which are reciprocable with a fluid tight fit in a cylinder 165 formed preferably in the adjacent end of the engine crank shaft 8. A relatively fixed cylinder head 166 having a suitable packing ring thereon is secured immovably in the cylinder 165, preferably by seating it against an annular shoulder 167 formed in the cylinder and retaining it against said shoulder by the bearing 12 which is preferably an annular ball bearing and is pressed into the respective end of the cylinder. The shaft section 140 and the sleeve 160 are provided with ports 168 which provide communication between the space within the cylinder 165 between the piston 164 and cylinder head 166 and the axial passage 157 in said shaft section. Fluid pressure admitted to the axial passage 157 through the port 155 or 156 will enter the space between said piston and cylinder head and act to move the piston and shaft sections 140 and 141 toward the left in Fig. 1, and to thereby shift the clutch member 128 into engagement with the clutch teeth 125 on the pinion carrier member 119a, as shown in Fig. 3, any oil or fluid trapped at the outer side of the piston being vented to the rotor chamber 22 through vent passages 169; and movement of said piston and shaft sections in the opposite direction, by means to be hereinafter described, will shift the clutch member 128 to engage it with the clutch teeth 127 on the internal gear 126, as shown in Fig. 2, any oil or fluid trapped between the collar 150 and the adjacent end of the chamber 151 being vented through the ports 152 to the exterior of the shaft 7 where it may return to the rotor chamber 22.

The operations of the clutch member 128 are controlled by a set of rails 170, 171 and 172, which are mounted to reciprocate in the upper portion of the gear casing 3. The shifting fork 131 for this clutch member is mounted loosely on the rail 170 between a collar 173 pinned or otherwise fixed to this rail and a spring 174 which encircles this rail and abuts against a collar 175 which is pinned or otherwise fixed to said rail. A sleeve 176 having shifting lugs 177 thereon is loosely mounted on the rail 170 between a cam 178 which is pinned or otherwise fixed to this rail and a spring 179 which encircles this rail and abuts against the collar 173 fixed on said rail. Consequently, longitudinal movement of the rail 170 in one direction from its normal neutral position shown in Fig. 1 will shift the clutch member 128 into driving engagement with the clutch teeth 127 on the internal gear 126 for direct drive between the rotor and the driven shaft 2, and movement of this rail in the opposite direction will shift said clutch member into driving engagement with the pinion carrier member 119a for overdrive or drive of the driven or propeller shaft 5 at a higher speed than that of the rotor. The rail 172 carries a shifting fork 180 which is mounted loosely thereon between a collar 181 pinned on this rail and a spring 182, the latter abutting against a shifting dog 183 pinned on the rail 172, and having shifting lugs 184 thereon, an arm on the shifting fork 180 engaging in a peripheral groove in the clutch ring 112. While the transmission is set in neutral position as shown in Fig. 1, or for direct or overdrive as in Figs. 2 or 3, respectively, the clutch ring will engage only the clutch teeth 111 on the main transmission shaft 9 and rotate idly therewith, but when the rail 172 is shifted to the left from the neutral position shown in Fig. 9, the clutch ring 112 will bridge or engage both the clutch teeth 111 and the clutch teeth 113, thereby coupling together the main transmission shaft 9 and the sleeve 110 which carries the reverse sun gear 120, thereby causing this gear to rotate with the rotor. Shift of the rail 172 to the right or from the position shown in Fig. 9 will shift the fork 180, through the spring 182, until the clutch ring 112 has disengaged from the teeth 113 on shaft 9 to free the sun gear from the shaft 9 whereupon a lug 185 on the fork 180 abuts against a stop pin 186 fixed in the gear casing section and arrests further movement of fork 180 toward the right but further movement of the rail 172 will be permitted by compression of the spring 182.

The rail 171 has a shifting dog 187 pinned or otherwise fixed thereon, this dog carrying the brake ring 116, and while the rail 171 is in the position shown in Fig. 10, the clutch ring 116 will be in the position shown in Figs. 1 and 2 and will hold the teeth 115 on the brake ring in engagement with the teeth 114 on the sleeve 110, thereby holding this sleeve from rotation since the brake ring is splined to the anchor member 122 fixed in the gear casing 3, thereby holding the sun gear 120 from rotation; and when the rail 171 is shifted to the left from the position shown in Fig. 10 into the position shown in Fig. 9, the brake ring 116 will be disengaged from the brake teeth 114 on the sleeve 110 and its brake teeth 117 engaged with the brake teeth 118 on the pinion carrier member 119, thereby holding the pinion carrier from rotation and setting the gearing for direct and reverse drive. The dog 187 is controlled manually by a hand lever 190 which is pivoted on an axis 191 in any convenient or remote position within reach of the operator, this lever being arranged to cooperate with either one of a pair of retaining notches 192 and 193 in a sector 194, the notch 192 serving to hold this lever set for reverse and direct driving, and the notch 193 for direct and overdrive driving. This lever is connected by any suitable means to the dog 187, as by a link 195 connecting it to one arm of a bell crank lever 196 pivoted at 197 to a suitable part of the gear casing 3, the other arm of this bell crank lever extending into the gear casing and engaging a fork 199 on the dog 187. The dog 187 is also provided with a pair of interlock lugs 200 and 201, for a purpose which will hereinafter appear.

The shifting lugs 184 on the fork 183 fixed to the shaft 172 are opposite to the shifting lugs 177 on the rail 170 while the rails 170 and 172 are set for neutral as shown in Figs. 9 and 10. The rail 172 also carries a transfer member 202 having a pair of longitudinally spaced lugs 203 and 204 thereon, and the shifting fork 131 on the rail 170 is provided with a lug 205 extending therefrom for movement between said lugs. The lugs 203 and 204 are so spaced apart and located relatively to the lug 205 that the rail 172 is free to shift to the left from the position shown in Fig. 9 to engage the clutch member 112 with the clutch teeth 113 on the main shaft 9 as well as the teeth 111 on the sleeve 110 which carries the reverse driving sun gear to set the gearing for reverse without contacting the lug 204 with the lug 205 projecting from the fork 131 while the clutch member 128 is in neutral position, such shifting movement of the rail 172 being limited by engagement of the shifting dog 183 thereon against the adjacent end wall of the gear casing 3, but if the clutch member 128 is engaged with the direct drive teeth 127, it will be disengaged therefrom and set in neutral. The rail 172 also serves to manually set the clutch member 128 in direct drive position by movement of this rail toward the right from its position as shown in Fig. 9, such movement of this rail bringing the lug 203 against the lug 205 on the shifting fork 131 and moving the latter in a direction to engage the clutch member 128 with the teeth 127 on the gear 126 for direct drive. During such movement of the rail 172, the spring 182 will be compressed, due to engagement of the stop pin 186 with the lug 185 on shifting fork 180, thereby permitting the rail 172 to shift to a sufficient extent to place the gearing in direct drive while the clutch ring 112 is positioned over the clutch teeth 111.

Suitable interlocking means is preferably provided between the rails 170, 171 and 172 to coordinate their operations. Such means comprises preferably a pair of plungers 210 and 211 which are freely movable endwise in an end wall of the gear casing 3 and notches or recesses formed in the sides of the rails to cooperate therewith. The rails 170 and 172 each have a single notch 212 and 213 respectively to cooperate with the outer ends of the respective plungers, and the central rail 171 has a pair of notches 214 and 215 which are relatively offset longitudinally at the opposite sides of this rail. The notches 212, 213 and 214 are so located along the respective rails as to receive the adjacent ends of the plungers while the rails are set for a neutral position but when the rails are set for a shift to reverse or direct drive, as shown in Fig. 9, the length of the plungers and the depth of the notches is such that the rail 170 is then locked against movement but the rail 172 is unlocked and free to be moved. When, however, the rail 171 is shifted to the position shown in Fig. 10 to set the rails for direct and overdrive, the plunger 210 is displaced from the notch 214 in the rail 171 and engaged in the notch 213 in the rail 172, thereby locking this rail from movement, and the plunger 211 will be free to enter the notch 215 in the rail 171, thereby unlocking the rail 170 for movement in either direction for a shift to direct or overdrive respectively.

The rails are shifted manually by a shift lever which is preferably mounted on the steering column of an automobile or other vehicle. As shown in the present instance, a shift lever 220 is provided having a pivotal connection by a pivot pin 221 with a shaft 222 which is mounted rotatably in bearing brackets 223 fixed to a side of a steering column 224, the lever having a casing 225 at its inner end which extends over the top of said shaft and beyond it and has a fulcrum portion 226 which bears on the top of the upper bracket. The shift lever is thus mounted for raising and lowering movement about the pivot pin 221 as an axis for swinging movement in an upper or lower arc about the axis of the shaft 222 as a center, thus simulating the movements of the conventional gear shifting lever of an automobile, and the shaft 222 will be raised or lowered by such raising or lowering movement of the shift lever. A shifting shaft 227 is mounted rotatably in the upper part of the gear casing 3 above the rails, and an end of this shaft extends to the exterior of a side of said casing and has an actuating arm 228 pinned or otherwise fixed thereto. This arm is provided with a slot 229 in which an arm 230 fixed to the lower end of the shaft 222 engages, whereby swinging movement of the shift lever 220 in one or the other direction will swing the arm 228 and thereby rock the shaft 227 in one or the other direction. A shifting arm 231 is provided on the shaft 227 and is engageable selectively with the shifting forks on the rails 170 and 172 and is rotatable with said shaft to reciprocate the selected rail. As shown, this arm is formed with a sleeve-like hub 232 which is slidable longitudinally on the shaft 227 but is splined to rotate therewith by a key 233 in the hub which engages in a keyway 234 formed longitudinally in the shaft. Preferably, the shifting arm 231 is normally and yieldingly engaged with the rail 170, it being held in such engagement by a spring 235 which is interposed between the hub of this arm and the adjacent side of the gear casing, this spring being yieldable under manual effort applied to the gear shift lever 220 to raise it to permit transfer of the arm 231 from the rail 170 to the rail 172, such transfer being accomplished by upward movement of the shaft 222 through a grooved collar 236 fixed on said shaft and engaged by one arm of a bell crank 237 mounted on a fixed pivot 238, the other arm of this bell crank being connected by a link 239 to an arm 240 fixed to the hub 232 of the shifting arm 231. The spring 235 normally holds the shifting arm 231 in engagement with the fork 177 on the rail 170, thus setting the transmission for manual shifting into direct or overdrive and from overdrive to direct drive by shifting this rail in one or the other direction.

Means is provided for effecting shifts from direct drive to overdrive and from overdrive to direct drive under control of the fuel control element of the engine in conjunction with the master governor 85, preferably the usual accelerator pedal of an automobile. For this purpose, the sleeve 100 is provided at its rear end with a tapered or cam portion 245 which is engageable with a radially arranged plunger 246 mounted slidably in the adjacent wall of the gear casing 3, this plunger being pressed by a spring 247 into engagement with said cam portion at its inner end and acting at its outer end on a ball 248 and pressing the latter against the cam 178 which is pinned or fixed on the rail 170 and has a rounded end 249 and a groove or recess 250 adjacent thereto with one or the other of which the ball 248 is engageable under the pressure of the spring 247. The power of this spring when compressed is sufficient to move the cam 178 and rail 170 to the right when the ball 248 engages the rounded end 249 of cam 178, or to cause a snap action of rail 170 to the left when the ball 248 approaches recess 250. While the transmission is set in neutral, the ball 248 is pressed against the side of the cam 178 between the groove 250 and the adjacent rounded end of the cam, as shown in Fig. 1, and while the transmission is set in direct as shown in Fig. 2, this ball is pressed against the rounded end of the cam, and when the transmission is shifted to overdrive, this ball is engaged in the groove 250, as shown in Fig. 3, thereby locking the transmission in overdrive.

The shifting fork 104 for the collar 103 fixed to the sleeve 100 is mounted loosely on the rail 171 and held yieldingly against a stop collar 253, pinned or otherwise fixed to said rail, by a spring 254 which is interposed between this fork and a collar 257 fixed to the forward end of the rail 171. The rail 172 has an arm 255 pinned thereon, this arm extending beneath the rail 171 and spring 254, and an arm 258 extends loosely over the rail 170, and is in a position to be engaged by the arm 255, the arm 258 being fixed rigidly to a slide 259 guided to reciprocate longitudinally of the transmission by suitable guides 260 which may be secured to the under side of the top or cover of the control casing section 2, springs 261 and 262 being interposed between the respective sides of this arm and collars 263 and 264 which are pinned or otherwise fixed to the rail 170. The slide 259 carries a plunger 265 which is normally held yieldingly in a raised position by a spring 266, this plunger being located below the forward or toe end of the fuel control element or accelerator pedal 267. The accelerator pedal corresponds to that commonly employed in automobiles for controlling the operation of the engine, it being pivoted at 268 on a suitable fixed bracket 269 to rock forwardly and rearwardly, it being connected to a throttle operating arm 270 which is suitably connected, as by a link 271 and a lever 272 pivoted at 273 on the transmission casing, to a rod 274 which operates the throttle 275 of the carburetor 276 which supplies fuel to the engine. In applying the present invention to an automobile equipped with such a throttle or accelerator pedal, the operating rod 274 is provided with springs 277 and 278 which are interposed between the respective sides of the carburetor lever 279 and a pair of collars 280 and 281 which are fixed on the rod 274, thereby permitting this rod and the accelerator pedal connected thereto to be operated beyond the fully open or fully closed throttle position, opening and closing movements of the throttle operating lever 279 being limited by suitable stops 282 and 282a respectively.

Below the plunger 265 are mounted a pair of bell crank levers 285 and 286 which are pivoted to rock on pivots 287 and 288 respectively, the arms 289 and 290 of these bell crank levers extending toward one another, and a separating or holding member 291 being fixed to a side of the casing and extending between the adjacent ends of the arms 289 and 290. By this structure, while the plunger 265 occupies the position shown in Fig. 1 in which the transmission is in neutral, the lower end of this plunger will be directly above the member 291 so that depression of the plunger will not operate either of said bell cranks, but while the transmission is in direct drive, as shown in Fig. 2, the plunger 265 will occupy a position above the arm 290 of the bell crank 286 and at one side of the member 291, so that depression of said plunger will rock this bell crank on its pivot, and while the transmission is in overdrive, as shown in Fig. 3, the plunger 265 will occupy a position above the arm 289 of the bell crank 285 and at the other side of the member 291 so that depression of said plunger will then rock the bell crank 285 on its pivot.

The setting of the plunger 265 in these different positions is controlled by the setting of the rail 170. For this purpose, the bell crank 285 has its other arm pivotally connected to a rod 295 which extends loosely through an opening 296 in the shifting fork 104 and has a head 297 fixed thereon to engage the rear side of said fork. This loose connection permits the sleeve 100 and its shifting collar 103 to move forwardly independently of the bell crank 285 and plunger 265 but connects the fork 104 for movement forwardly when the bell crank 285 is rocked by depression of the plunger 265. The bell crank 286 has its other arm pivotally connected to a rod 298 which extends loosely through an opening 299 in the lever 67 and has a head 300 fixed thereon to engage the forward side of said lever. The throttle operating rod 271 extends loosely through the fork 69 on the lever 67 and has a collar 301 adapted to be fixed thereon in a position to abut against the upper end of said lever when the accelerator pedal is rocked rearwardly in a closed throttle direction to or beyond its fully closed throttle position, and during such operation of the accelerator pedal, the lever 67 is rocked about its pivot 68 in a direction to retract the sleeve 53, thereby retracting the inner valves 41, and also, through the springs 57, the outer valves 40 against the action of the spring 64, thus shifting the valves 40 and 41 from their normal partially open position as shown in Fig. 1 to or toward their fully open position as shown in Fig. 18. The lever 67 also has an arm 305 fixed thereon and projecting rigidly therefrom in a position to be engaged and lifted by a toe 306 projecting rigidly from the bell crank lever 285 when the latter is actuated by depression of the plunger 265.

A master control member, operable at the will of the operator, is provided for over-riding the master governor and all of the other controls and for applying the brake to retard or lock the driven or propeller shaft 5 from rotation, this member preferably comprising a pedal 310 which is mounted on a shaft 311 rotatable in the lower portion of the casing section 2, this shaft having a shifting dog 312 keyed or otherwise fixed thereon and arranged to engage and shift the collar 103 forwardly against the action of the spring 254, thereby shifting the sleeve 100 forwardly to relieve the spring pressure on the ball 248 and thus release the cam 178, permitting the shaft 170 to shift under the action of the spring 179 from the overdrive setting shown in Fig. 3 to direct drive as shown in Fig. 2, and also causing the extensions 102 on the forward end of the sleeve 100 to over-ride the master governor and to push the members 93 thereof, against centrifugal force, toward their retracted position, thus permitting the spring 58 to retract the sleeve 60 and thereby pull the valves 40 and 41 into the open position shown in Fig. 1. In order, however, to permit shifting of the sleeve 100 by the setting of the rail 171 independently of the master pedal, the latter is preferably mounted loosely on the shaft 311 so that said shaft may be rotated in a direction to advance the sleeve 100 while the master pedal remains in an inactive position, and a dog 315 is keyed or fixed to the shaft 311 and provided with an arm 316 arranged in the path of the pedal to be engaged and operated thereby when the master pedal is depressed.

An interlock is provided between the master pedal and the transmission setting or operating shaft 227 to prevent setting or operation of the transmission unless the master pedal is depressed. Such interlock comprises preferably a plunger 320 mounted slidably in a suitable bracket 321 fixed to the adjacent side of the transmission casing and loaded by a spring 322 which acts to press this plunger into one or another of a set of notches 323, 324 and 325 formed in a segment-like portion 326 formed on or fixed to the actuating lever 228, these notches when engaged by the plunger 320, serving to lock the shaft 227 when set in neutral, direct drive or over-drive and reverse, respectively, the shaft 227 being shown in Fig. 15 as locked in its neutral setting corresponding to the condition of the transmission when set as shown in Fig. 1. The locking plunger 320 is releasable automatically by the master pedal 310 when the latter is depressed, it being connected to this pedal by a link 327 which cooperates with a pin 328 fixed to said pedal. In order to enable the master pedal to be operated to an extent sufficient to over-ride the master governor and the other controls without unlocking the shaft 227, or to be operated to a further extent to shift the collar 103 sufficiently to cause control valve 40 to be fully opened by spring 58, and thereby neutralize the transmission mechanism and to bring the brake rings 105 and 106 into engagement, the link 327 is provided with a slot 329 in which the pin 328 operates, the pin moving idly in this slot while the master pedal is being depressed to an extent to override the master governor and the other controls, but picking up the end of this slot and pulling the link 327 and thereby withdrawing the plunger 320 from the notch in the segment which it engages, thereby unlocking the shaft 227 to permit a change in the setting of the transmission, and by depressing the master pedal to its full extent, the friction-ring 105 on the collar 103 is brought into engagement with the relatively fixed friction ring 106, thereby bringing the rotor to rest or holding it from rotation, and thereby facilitating engagement of the clutch members of the gearing. It is to be noted that while the shiftable clutch member 128 is engaged with the pinion carrier clutch teeth 125 or with the ring gear clutch teeth 127, the master pedal 310 can be operated to cause the control valve 40 to be fully opened by spring 58 and thereby neutralize the transmission mechanism and to bring the brake member 105 into contact with brake member 106 and thereby retard or lock the driven or propeller shaft 5 from rotation, thus effectively applying the brake to stop the rear or driving wheels of the motor vehicle.

The operation of the improved transmission is as follows:

Assuming that a sufficient amount of oil or other suitable operating fluid has been placed in the rotor reservoir 22 to bring the oil level therein to near the height of the lower side of the bearing 52, and that the transmission is set in neutral as shown in Fig. 1, starting of the engine will throw all of the oil to the periphery of the rotor reservoir 22, thus forming an annular body of oil which covers the inlets 30 of the torque pumps carried by the rotor. The rotation of the gear 35 driven from the engine crank shaft 8 causes rotation of the pump driving gears 34 in the rotor which is then stationary, or substantially so, causing oil to be drawn into the torque pumps through their inlets 30 and to be exhausted therefrom and returned to the reservoir 22 through the outlet passages 31 into the valve chambers 32. While the transmission is in neutral, the valves 40 and 41 are held partly closed by the stop spring 64, as shown in Fig. 17, thereby causing the rotor to rotate slowly and thereby facilitate meshing of the clutch members of the gearing, but if it is desired to stop rotation of the rotor or relieve any drag on the rotor, the accelerator pedal 267 is rocked rearwardly thereby causing the collar 301 to engage the upper end of the lever 67 and to rock this lever in a direction to retract the sleeve 53, thus drawing the valves to fully open position, as shown in Fig. 18. Should there be any drag on the rotor after such operation of the accelerator pedal, it may be completely removed by depressing the master pedal 310, thereby advancing the collar 103 sufficiently to engage the friction brake ring 105 thereon with the stationary brake ring 106, thereby stopping the rotor and the shaft 7 on which it is mounted.

After rotation of the rotor has been stopped, and while the master pedal 310 is held depressed, thus holding the plunger 320 in unlocked relation with the locking sector 326, the transmission may be set in condition for direct or overdrive by rocking the accelerator pedal rearwardly, and by placing the lever 190 in the notch 193 of the sector 194, and the transmission may then be placed in direct drive by swinging the shift lever 220 in a direction to cause the shifting arm 231 on the shaft 227 to shift the sleeve 176, and through the spring 179, the rail 170 from the neutral position shown in Fig. 1 to the direct drive position shown in Fig. 2, the collar 173 fixed to this rail carrying with it the fork 131 and thereby shifting the clutch member 128 from the neutral position shown in Fig. 1 into engagement with the direct drive clutch teeth 127 on the gear 126 fixed to the driven or propeller shaft 5. By holding the accelerator pedal in its rearwardly rocked position during this setting operation, the collar 301 on the throttle operating rod 271 is pressed against the upper end of the lever 67, thereby withdrawing all of the valves 40 and 41 and holding them in open position as shown in Fig. 18. The master pedal 310 may then be released to return to its normal position, thereby re-engaging the plunger 320 with the sector 326 and locking the sleeve 176 from movement.

After setting the transmission as just described, the accelerator pedal may be depressed at its forward or toe end, thereby retracting the collar 301 from the lever 67 and permitting the stop spring 64 to close the valves to a predetermined extent, as for example, to a half-closed position substantially as shown in Fig. 17. Such partial closing of the valves restricts the discharge of fluid through the outlets 31 of the torque pumps, and by gradually increasing the speed of the engine, the output of the pumps is greatly increased and pressure in the fluid is built up in their outlets, reaction of which resists rotation of the pumps and thereby imparts a torque to the rotor which is commensurate with the output of the torque pumps. Power is thereby transmitted from the driving shaft gear 35 through the pump driving gears 34, and the rotor and the intermediate shaft 7 carrying it, to the main transmission shaft 9, and from the latter to the clutch member 128, clutch teeth 127 and to the driven or propeller shaft 5. While the engine is running, the secondary governor members 76 are thrown outwardly by centrifugal force depending on the position of the accelerator pedal and the extent of the throttle opening, and as the intermediate shaft 7 begins to rotate, the master governor members 93 are thrown outwardly by centrifugal force, and as the speed of rotation of the intermediate shaft increases, the master governor acts to further close the valves, until the flange 61 comes into contact with the secondary governor members 76 which tend to resist closing of the valves. When the intermediate shaft 7 reaches a speed slightly below the speed of the engine or driving shaft, the master governor members 93 are thrown outwardly with a sufficient force to overcome the secondary governor members 76 and to complete the closing of the valves, stopping circulation of the torque transmitting fluid and thereby creating a hydraulic lock through the torque pumps and transmitting torque from the driving to the driven shaft at equal speed of these shafts. This intercontrol between the master and secondary governors under control of the extent of throttle opening and the position of the accelerator pedal enables the torque transmitted from the driving to the driven shafts to be increased gradually, thereby avoiding abrupt increase of load on the engine or driving member. While the transmission is in operation in direct drive, as described, the governor arms 92 are swung inwardly into the position shown in Fig. 2, thereby locking the sleeve 60 in its closed valve position as shown in this figure due to the overcenter movement of arms 92.

While the transmission is conditioned for direct and overdrive, the brake ring 116 engages the brake teeth 114 on the sleeve 110 on which the reverse gear 120 is fixed, thereby holding this gear from rotation, but allowing the pinions 121 to rotate idly around this gear. If it is desired to set the transmission in overdrive, this may be accomplished by depressing the accelerator pedal forwardly beyond its fully open throttle position and causing it to depress the plunger 265, which under these conditions will be above the arm 290 of the bell crank lever 286, thereby rocking this bell crank lever and, acting through its linkage therewith, retracting the valve sleeve 53 and thereby pulling the inner valves 41 into positions to establish communication between the pump discharge ports 31 and 31a in the rotor hub, and through the ports 42 and 43 in the outer valve 40 which are then held in communication with the ports 31 and 31a, and through the port 155 and axial passage 157, as shown in Fig. 20, fluid under pressure from the discharge of the torque pumps being thereby supplied to the cylinder 165 in the space therein between the piston 163 and the fixed cylinder head 166, the fluid pressure thus introduced into this cylinder acting on the piston to shift the shaft 140, 141 to the left in Fig. 2 and correspondingly shifting the clutch member 128 into the position shown in Fig. 3, thereby disengaging it from the direct drive clutch teeth 127 and engaging it with the overdrive clutch teeth 125 on the pinion carrier member 119a. During this operation, and while the fluid is flowing from the torque pumps into the cylinder 165, pressure of the fluid in the discharges of the torque pumps drops and thereby momentarily interrupts transmission of torque through the rotor, thus enabling the clutch member 128 to disengage from the direct driving clutch teeth 127 and to engage the overdrive clutch teeth 125. The torque through the rotor is, however, re-established as soon as the cylinder space 165 is filled with oil and the clutch shift has been completed.

During the shift of the clutch member 128 from the direct drive teeth to the overdrive teeth 125, shift of the fork 131 toward the left from the position shown in Fig. 2 to that shown in Fig. 3 causes it to act on the collar 173 fixed on rail 170 and to compress the spring 179 between it and the shifting sleeve 176, which is loosely mounted on the rail 170 and is then locked from movement by the plunger 320 which prevents rotation of the shaft 227, the rail 170 being thereby shifted into the position shown in Fig. 3, carrying with it the cam 178 which is pinned thereto, thereby causing the spring-pressed ball 248 to engage in the recess 250 in this cam, the spring 247 which presses the ball 248 into recess 250 of cam 178 having sufficient power to move and hold the cam 178 and the rail 170 to the left as shown in Fig. 3, the spring 179 being thereby loaded to supply power to return the rail 170 to direct drive position, but being restrained by the ball 248 engaging the recess in the cam 178. Shift of the rail 170 also transfers the plunger 265 from a position above the bell crank 286 as shown in Fig. 2 into a position above the bell crank 285 as shown in Fig. 3, and during such shift of said rail, the separating member 291 prevents dislodgment of the plunger 265 from the bell crank 286 until it has completed its operation, the spring 261 being compressed while the plunger 265 is pressed against the side of the member 291 and thereby avoiding obstruction to the shift of the rail 170, and upon return of the forward end of the accelerator pedal to its raised position to permit lifting of the plunger 265, the spring 261 furnishes power to push the lower end of said plunger over the top of the member 291 and into a position at the other side thereof, as shown in Fig. 3.

If it is desired to shift from overdrive to direct drive, such may be accomplished by merely depressing the accelerator pedal forwardly beyond fully open throttle position, thereby depressing the plunger 265 and causing it to engage and depress the arm 289 of the bell crank lever 285, rocking it in a direction to pull the rod 295 in a direction to shift the collar 103 to the left in Fig. 3, carrying with it the sleeve 100. Such movement of said collar and sleeve causes the cam portion 245 on the hub of the collar to retract and unlock the cam 178 by unloading the spring 247 and loads the spring 254 to store power therein for the return of said collar to the position shown in Fig. 2, and to simultaneously advance the sleeve 100 to retract the master governor members 93 against the action of centrifugal force, causing the arms 92 to be retracted from the flange 78 and thus releasing the sleeve 60 for retraction under the action of the valve opening spring 58 until arrested by the spring 64. The valves 40 and 41 are thus partially opened, and the depression of the plunger 265, which rocked the bell crank lever 285, also raised the toe 306 thereon into engagement with the arm 305 on the lever 67, thereby rocking this lever in a direction and to an extent to retract the sleeve 53, thereby completing the full opening of the valves against the action of the spring 64. When the valves are thus fully opened, the torque through the rotor is completely interrupted, after which the spring 179 is free to shift the fork 131 to disengage the clutch member 128, oil or fluid in the cylinder 165 between the piston 163 and cylinder head 166 is exhausted through the axial passage 157, ports 156 and into the valve chambers 32, the ports 156 being then uncovered by the valves 40, as shown in Fig. 18. When the accelerator pedal is permitted to rise or return to throttle controlling position, the plunger 265 is permitted to rise, thus permitting the bell crank lever 285 to return to its normal position and relieving the pull on the rod 295, the latter then releasing the fork 104 and permitting the spring 254 to return the collar 103 to the position shown in Fig. 2 and returning the spring loaded ball 248 to the condition shown in Fig. 2. Return of the collar 103 to the position shown in Fig. 2 also retracts the sleeve 100 from the master governor, thus freeing the latter to function under the action of centrifugal force, and to act on the sleeve 60 to return the valves to closed position, thereby re-establishing transmission of torque through the rotor. Return of the plunger 265 to its raised position also places it above the bell crank lever 286, as shown in Fig. 2, thus setting the transmission in condition for a shift to overdrive.

When it is desired to set the transmission for driving in reverse and direct, the transmission is restored to neutral condition by swinging the shifting lever 220 into neutral position, thus returning the sleeve 176 to its neutral position as shown in Fig. 1, and returning the cam 178 to the position shown in that figure, thus rendering this cam inactive. The lever 190 is then placed in the notch 192 in the sector 194, thereby shifting the fork 187 and the rail 171 toward the left in Fig. 1, disengaging the brake teeth 115 on the brake ring 116 from the brake teeth 114 on the sleeve 110, thus releasing the sun gear 120, and engaging the brake teeth 117 on the brake ring with the brake teeth 118 on the pinion carrier member 119, thereby holding the pinion carrier from rotation and conditioning the transmission for operation in direct and reverse. Such shifting of the rail 171 operates the fork 104, causing it to shift the collar 103 and the sleeve 100 toward the left in Fig. 1, thereby bringing this sleeve into a position to be engaged by the heels of the master governor members 93, thus permitting the governor to completely close the valves 40 and 41 under centrifugal force but not allowing the governor members to assume a locking position such as shown in Fig. 2. When the master governor is placed in such condition, the above described shift of the rail 171 to the left also locks the rail 170 and unlocks the rail 172 by shifting the positions of the plungers 210 and 211 and shifts the interlock lug 200 out of the path of the arm 231 so that it may be shifted from the fork 177 on the rail 170 to the fork 184 on the rail 172. The shift lever 220 may then be lifted from its normal lower position, thereby transferring the arm 231 from the former to the latter fork, as described.

With the transmission in the condition just described, if it is desired to set it in reverse, the shift lever 220 is swung in a direction to shift the fork 180 and clutch ring 112 toward the left in Fig. 1 to cause it to bridge the clutch teeth 113 on the main transmission shaft 9 and the teeth 111 on the sleeve 110, thereby coupling the sun gear 120 to the main transmission shaft. As the sun gear will be thereby rotated in the direction in which the driving shaft and rotor are rotating, it rotates the pinions 121 meshing therewith in the opposite or reverse direction, and the engagement of these pinions with the internal gear 126 causes it and the driven or propeller shaft 5 to be also rotated in the reverse direction but at a lower speed ratio. The torque may then be transmitted through the rotor under control of the accelerator pedal, as hereinbefore described.

In order to change the setting of the transmission from reverse to direct, the shift lever 220 is swung in a direction to shift the rail 172 toward the right from the position shown in Fig. 9, thereby shifting the transfer member 202 to bring the lug 203 thereon into engagement with the arm 205 on the fork 131, and continued movement of said rail in said direction carries with it the fork 131 loosely mounted on the rail 170, thereby engaging the clutch member 128 with the direct drive clutch teeth 127. The transmission is then in condition for direct drive, and the torque transmitted is controlled by the accelerator pedal, as hereinbefore described. The shift of the rail 172 toward the right in Fig. 9, as described, carried with it the arm 255 fixed thereto, thereby bringing it into contact with the arm 258 which fits loosely over the rail 170 and is balanced between the springs 261 and 262 and is connected to the plunger slide 259, thereby shifting the plunger 265 from the neutral position shown in Fig. 1 to the position shown in Fig. 2 above the arm 290 of the bell crank 286. Assuming the automobile or vehicle is being driven in direct drive, and acceleration thereof beyond the power of the engine obtainable in direct drive is desired, such may be accomplished by depressing the forward or toe end of the accelerator pedal beyond the fully open throttle position and depressing the plunger 265, thereby engaging it with the bell crank 286 and rocking this bell crank in a direction to pull the rod 298 and with it the lever 67, with the result that the sleeve 53 is retracted and with it the valves 41, and through the springs 57, the valves 40, against the action of the master governor which is then in non-locking condition, thereby opening to the desired extent the discharge passages 31 of the torque pumps, similar to that shown in Fig. 17. The effect of this is to relieve the pressure of the oil or fluid in the discharge passages of the torque pumps, and to thereby enable the engine to attain a higher speed relatively to that of the rotor. By raising the accelerator pedal sufficiently to permit the plunger 265 to return to its normal raised position, the valves are permitted to fully close under the influence of the master governor, thereby re-establishing the normal direct drive condition of the transmission.

When it is desired to place the transmission mechanism in neutral condition, the setting lever 190 on the segment 194 will be moved beyond the notch 192. This setting of this lever will advance the collar 103, sleeve 100 and extensions 102 fixed thereto to the left. The extensions 102 will pass under the arms 92 of the the governor 93 and immobilize the governor, thus permitting the valve springs 58 to open the valves 40, and by rocking the accelerator pedal 267 in the direction to close the throttle, it will fully open the valves 40 as shown in Fig. 18. At the time that the collar 103 was moved to the left, the cam portion 245 of this collar also moved to the left, which allowed the spring plunger 246 to drop and thus relieve the spring tension on spring 247 and ball 248, and thus immobilize the elements which move and hold the cam 178 as previously described. The master-pedal 310 may then be depressed to withdraw the plunger 320 from the segment 326 in Fig. 15. This action permits the shifting lever 220 to move to the neutral position, thereby placing clutch member 128 in a neutral position as shown in Fig. 1. With the clutch member 128 placed in a neutral position, the master pedal 310 is allowed to return to its normal position, as shown in Fig. 15, and to thus lock the segment 326 and the clutch 128 in said neutral position.

Before the transmission is set in any of the conditions hereinbefore described, the master pedal 310 is first depressed, thereby unlocking the sector 326 fixed on the shifting shaft 227 to permit rotation thereof, and after the selection has been made, the master pedal is permitted to return to its normal position, causing the plunger 320 to lock said shaft.

Although the invention is applicable generally to power transmissions for operating machines or machinery of various kinds, it is particularly advantageous when applied to automotive vehicles employing transmissions of types than the hydraulic type hereinbefore described for controlling the operation thereof. The controlling means provided by the present invention, when applied to an automobile, enables the transmission thereof to be set selectively for driving in a variable speed range in direct drive, or in reverse, as desirable for driving under congested traffic conditions as in cities, or to be set selectively for driving in direct or overdrive, as in driving on highways where traffic conditions are less congested and permit of driving at higher speeds. The means for selecting and effecting the different speed changes are intercontrolled, so that the various speed changes may be made with facility and safety, and in the proper sequence.

The novel gearing provided by the present invention, which is applicable to transmissions of types other than the hydraulic type shown, provides a simple and compact structure whereby the driven element of the transmission may be driven selectively in direct or reverse, or direct and overdrive, as desired, by a relatively simple shifting of elements of the gearing.

I claim as my invention:

1. A power transmission mechanism comprising driving and driven elements, means including a torque controlling element interposed between said elements for transmitting torque from the driving to the driven element, a master governor responsive to the speed of the driven element and operative upon said torque controlling element to increase the torque transmitted between said elements, an auxiliary governor responsive to the speed of the driving element and operative upon said torque controlling element to reduce the torque transmitted between said elements in opposition to the influence of the master governor, and means for restoring the master governor from speed operated condition to inactive condition.

2. A power transmitting mechanism as defined in claim 1, wherein said means for restoring said master governor is controlled manually and locks said master governor in inactive condition.

3. A power transmission mechanism for an automobile having a fuel control element, comprising driving and driven elements, means including a torque controlling element for transmitting torque at variable speed ratios from the driving to the driven element, a master governor responsive to the speed of the driven element and operative upon said controlling element of the torque transmitting means to effect transmission of torque to the driven element at a maximum speed ratio, a secondary governor responsive to the speed of the driving element and operative upon said controlling element of the torque transmission to effect transmission of torque to the driven element at a relatively reduced speed ratio, and means operable by the fuel control element of the automobile for restoring the master governor from its fully speed operated position toward inoperative condition and thereby overcoming the influence of the master governor on said controlling element of the torque transmitting means and for setting the latter in condition for transmission of torque at a relatively reduced speed ratio.

4. A power transmission mechanism comprising driving and driven elements, a single hydraulic unit connected to the driving and driven elements for transmitting torque from the driving element to the driven element, including valve means for varying the amount of torque transmitted through said unit and a controlling element for said valves, a governor responsive to the speed of the driving element and operative upon said controlling element to place said valve means in a condition to reduce the amount of torque transmitted to the driven element, yieldable means cooperative with said valve means to limit the amount of torque transmitted to the driven element, and a governor responsive to the speed of the driven element and operative upon said valve controlling element with a force superior to the influences thereon of said first-mentioned governor and said torque limiting means to increase the amount of torque transmitted through said hydraulic unit to the driven element.

5. A power transmission mechanism comprising driving and driven elements, a rotor having means for connecting it to the driven shaft and carrying hydraulic pumps connected to the driving element for circulating a fluid, valves for controlling said circulation of fluid and thereby controlling the transmission of torque through the rotor to the driven element, a governor responsive to the speed of the driving element and operative to open said valves, and a master governor responsive to the speed of the driven element and operative to close said valves in opposition to the first-mentioned governor when the driven element reaches a predetermined speed relatively to that of the driving element.

6. A power transmission mechanism according to claim 5, including a spring acting on said valves with sufficient force to hold said valves partially open against the action of said first-mentioned governor but with insufficient force to resist closing of said valves by said master governor.

7. A power transmission mechanism comprising driving and driven elements, gearing interposed between said elements for connecting them to drive the driven element at lower and higher speed ratios, means for transmitting torque from the driving element to the gearing and having means for interrupting the transmission of such torque, power operated means for respectively setting the gearing for driving at said speed ratios, and means including a selector having a pair of controlling members for the respective power operated means and for the torque interrupting means, and an actuator connected to said setting means for operation in coordination therewith to set the selector for operation of the actuator upon one of said controlling members for interrupting the torque and causing operation of one of said power operated means when the gearing is set for one of said speed ratios, and to set the actuator for operation upon the other of said controlling members to cause operation of the other power operated means to set the gearing for driving at the other of said speed ratios.

8. A power transmission according to claim 7 for an automobile having a fuel control element, wherein said actuator is operative by said fuel control element.

9. A power transmission mechanism comprising driving and driven elements, variable speed gearing interposed between said elements and having a member shiftable to set the gearing for relatively higher and lower speeds, means connected to the driving element and the gearing for driving the latter and for interrupting the driving thereof, power means connected to said shiftable member of the gearing for shifting said member to set the gearing for one of said speeds, power means connected to said shiftable member of the gearing for shifting said member to set the gearing for the other speed, and means including a selector having an actuator connected to the shiftable member for setting the selector, by the shifting of said member into a position to set the gearing for the relatively lower speed, for actuation of said interrupting means and for operation of one of said power means to shift said member into a position to set the gearing for the relatively higher speed and for actuation of said interrupting means and for operation of the other of said power means for return of said shifting member to restore the setting of the gearing for the relatively lower speed.

10. A power transmission according to claim 9 for an automobile having an accelerator pedal for controlling the throttle of the automobile engine, wherein said actuator is operative by said accelerator pedal when operated beyond fully open throttle position.

11. A power transmission mechanism comprising driving and driven elements, direct and overdrive gearing interposed between said elements and having a shiftable member for setting the gearing for direct or overdrive, power means for shifting said member to set the gearing for direct and overdrive respectively, means for driving the gearing from the driving element and having means for interrupting such drive, and a selector comprising controlling members for controlling said interrupting means and the respective power means, and an actuating member having means for shifting it with said shiftable member of the gearing, when shifted to set the latter for direct drive, into a position to actuate the controlling member for the power means for shifting said member of the gearing to set it for overdrive, and for shifting the actuating member by said shiftable member of the gearing, when shifted to set the latter for overdrive, into a position to actuate the controlling member for the other of said power means for shifting said shiftable member of the gearing to restore the latter for direct drive.

12. A power transmission according to claim 11 for an automobile having a fuel control element, wherein said actuating member is operative by said fuel control element.

13. A power transmission according to claim 11 for an automobile having an accelerator pedal for controlling the throttle of the automobile engine, wherein said actuating member is operative by said accelerator pedal when operated beyond fully open throttle position.

14. A power transmission mechanism comprising driving and driven elements, gearing interposed between said elements providing different ratios of speed transmission between said elements, variable torque transmitting means interposed between said elements, a governor responsive to speed of the driven element for controlling the torque transmitting means, and means for setting the gearing for different speed ratios and coincidently setting the governor in a condition to maintain the torque transmitting means in a predetermined condition when the gearing is set for one speed ratio and for coincidently retracting the governor in opposition to its response to speed and to set the governor in a condition to permit control of the torque transmitting means when the gearing is set for another speed ratio.

15. A power transmission mechanism according to claim 14, wherein said governor locks said torque transmitting means in said predetermined condition while the governor is in said first-mentioned setting and unlocks said torque transmitting means while the governor is in said second-mentioned setting to permit overriding of the governor and control of the torque transmitting means independently of the governor.

16. A power transmission mechanism according to claim 14, wherein said gearing comprises means which provides a direct drive and an overdrive from said driving to said driven element, and said first-mentioned setting sets the gearing for overdrive and said second mentioned setting sets the gearing for direct drive.

17. A power transmission mechanism according to claim 14, including means controllable at the will of the operator for controlling said torque transmitting means while said governor is set in said condition to permit control of said torque transmitting means.

18. A power transmission mechanism according to claim 14, wherein said torque transmitting means comprises fluid pressure means, and valves controlling the latter to vary the torque transmitted thereby.

19. A power transmission mechanism according to claim 14, wherein said torque transmitting means comprises hydraulic means for circulating a torque transmitting liquid, and valves controlling such liquid circulation to vary the torque transmitted by said hydraulic means.

20. A power transmission mechanism according to claim 14, wherein said torque transmitting means comprises hydraulic means for circulating a torque transmitting liquid and valves controlling such circulation, and including means for holding said valves in closed position by said governor while the latter is set in said predetermined condition and is freed by the governor for opening said valves while said governor is in said second-mentioned setting.

21. A power transmission mechanism for an automobile having throttle controlling means for the engine thereof, comprising a driving element connected to the engine and a driven element, direct and overdrive gearing between said elements, a member for setting the gearing for direct and overdrive for the driven element, torque transmitting means driven from the driving element and having means for varying the amount of torque transmitted thereby, a governor responsive to the speed of the driven element and cooperative with said torque varying means, means for actuating said member in one direction to set the gearing for overdrive and coincidently setting the governor in a condition to hold said torque varying means in a condition for transmission of maximum torque by said torque transmitting means, and means for actuating said member in another direction to set the governor in a condition for operation of said torque varying means and to coincidently set the gearing for direct drive, and means controllable by the engine throttle controlling means for operating the torque varying means independently of the governor.

22. A power transmission mechanism comprising driving and driven elements, gearing interposed between said elements and having a member for setting the gearing for driving the driven element from the driving element at different speed ratios, torque transmitting means between said elements having means for varying the amount of torque transmitted by said torque transmitting means and means for interrupting the transmission of torque through said torque transmitting means, a selector comprising a pair of controlling members for said setting member of the gearing, including means for controlling the torque varying and torque interrupting means respectively, and an actuating member shiftable by said setting member into actuating relation with one or the other of said controlling members, and means operable by one of the controlling members for actuating the setting member to set the gearing for one speed ratio and coincidently set said actuating member in actuating relation with the other of said controlling members, and means operable by the latter controlling member for actuating the setting member to set the gearing for another speed and coincidently to restore said actuating member to actuating relation with said one of said controlling members.

23. A power transmission mechanism according to claim 22, wherein said gearing embodies means for driving said driven element in direct and overdrive speed ratios relatively to said driving element, and said setting member is movable in a direction to set said gearing for direct drive and to coincidently set said actuating member in actuating relation with said controlling member which controls said torque varying means, and said setting member being movable in another direction to set said gearing for overdrive and to coincidently set said actuating member in actuating relation with said controlling member which controls said torque interrupting means.

24. A power transmission mechanism according to claim 22 for an automobile having an accelerator pedal for controlling the throttle thereof, wherein said actuating member is mounted in a position for operation, in each of said settings thereof, by movement of said accelerator pedal beyond the range of its throttle controlling movement.

25. A power transmission mechanism comprising driving and driven elements, gearing for driving the driven element at different speed ratios, fluid pressure means for changing the setting of the gearing from one speed ratio to another speed ratio, fluid pressure torque transmitting means between said elements, valves operative to divert fluid pressure from said torque transmitting means to said setting means and for controlling the amount of torque transmitted by said torque transmitting means, controlling members for operating said valves to divert the fluid pressure and to vary the torque respectively, an actuating member for said controlling members, and means for positioning said actuating member in actuating relation with said controlling member for operating the valves to vary the torque coincidently with the setting of the gearing for one speed ratio and for positioning said actuating member in actuating relation with said controlling member for operating the valves to divert fluid pressure coincidently with the setting of the gear for another speed ratio.

26. A power transmission mechanism comprising driving and driven elements, gearing between said elements for driving the driven element in direct and overdrive speed ratios, a shiftable member for setting the gearing for said speed ratios, hydraulic means for shifting said setting member to set the gearing for said speed ratios, hydraulic torque transmitting means between said elements, valves operable to divert pressure fluid from said torque transmitting means to said hydraulic means, valves operable to vary the amount of torque transmitted by said torque transmitting means, a pair of controlling members for operating said valves which divert pressure fluid to said hydraulic means and for operating said valves which vary the torque transmitted respectively, and selecting means including an actuating member connected to and shiftable by movement of said setting member in a direction to set the gearing for direct drive to coincidently position said actuating member in actuating relation with said controlling member for operating the valves which vary the torque transmitted by said torque transmitting means, and shiftable with said setting member by movement of the latter in a direction to set the gearing for overdrive to coincidently position said actuating member in actuating relation with the controlling member for operating the valves which divert pressure fluid to said hydraulic means for shifting the setting member.

27. A power transmission mechanism comprising driving and driven elements, gearing between said elements for connecting them for direct, reverse and overdrive, a pair of reciprocatory rails and cooperating members having means for positioning them to set the gearing in direct and overdrive and in direct and reverse respectively, manually operable means for reciprocating said rails, and a reciprocatory controlling rail operable selectively to control the operative relation of said manually operable means with one or the other of said pair of rails.

28. A power transmission mechanism according to claim 27, wherein said manually operable means for reciprocating said pair of rails comprises an actuating arm shiftable transversely of said rails, and said controlling rail is provided with means for controlling engagement of said arm with one or the other of said pair of rails, and said actuating arm is rotatable to reciprocate the rail which it engages.

29. A power transmission mechanism comprising driving and driven elements, gearing between said elements for connecting them for a lower or higher forward drive and for reverse drive, means including a pair of reciprocatory members having means for positioning them to set the gearing for the lower and higher forward drive and for one of said forward drives and reverse respectively, means selectively engageable with one or the other of said members for actuating it, and a member operable to control the engagement of said actuating means selectively with said pair of members.

30. A power transmission mechanism according to claim 29, including inter-controlling means cooperative with said members and operative by said controlling member to release one of said pair of members for actuation and to prevent actuation of the other of said pair of members.

31. A power transmission mechanism according to claim 29, wherein said pair of members and said controlling member are provided with recesses in their adjacent sides, and including plungers cooperative with the adjacent sides of said members and said recesses therein and controlled by said controlling member to lock one of said pair of members while the other member of said pair is unlocked for actuation.

32. A power transmission mechanism according to claim 29, including means on one member of said pair for setting said gearing for forward and reverse drive, and means operative by reciprocation of said member to set the gearing in neutral when said member is reciprocated to set the gearing for reverse drive.

33. A power transmission mechanism according to claim 29, including means on one member of said pair for setting said gearing for forward and reverse drive, and means operative by reciprocation of said member to neutral position to set the gearing for one of said forward drives.

34. A power transmission mechanism comprising gearing having elements for setting it for relatively lower and higher forward speeds and for reverse, and a shiftable member for connecting elements of the gearing for said forward speeds, a pair of members for setting elements of the gearing for said lower and higher forward speeds and for one of said forward speeds and reverse respectively, one of said setting members being connected to said shiftable member and having a spring acting thereon, power means for moving the latter setting member in a direction to set elements of the gearing for forward drive at one of said speeds and for loading said spring to provide power to move said member in a direction to set elements of the gearing for forward drive at the other of said speeds, manually operable means selectively engageable with one or the other of said setting members for actuating them to set elements of the gearing for forward or reverse or for lower or higher forward speeds and manually operable means for controlling the engagement of said actuating means selectively with said setting members.

35. A power transmission mechanism comprising driving and driven elements and gearing between said elements having gear elements for setting the gearing for direct and overdrive and for reverse, a pair of rails having means for connecting them to the gear elements for setting the gearing for direct and overdrive and for direct and reverse respectively, means for selectively operating one or the other of said rails, torque transmitting means between the driving element and the gearing for driving the gearing and having means for varying the amount of torque transmitted thereby, a member connected to said torque varying means for operating it, an actuating member movable to and from actuating relation with said operating member, and means on one of said rails for moving said actuating member into actuating relation with said operating member by movement of one or the other of said rails into a position to set the gearing for direct drive.

36. A power transmission mechanism according to claim 35, wherein said last-named means comprises an arm connected to said actuating member and yieldingly connected to said rail for setting said gearing for direct and overdrive, and a cooperating arm fixed to said rail for setting said gearing for direct and reverse drive and engageable with said arm connected to said actuating member by movement of the last mentioned rail into a position to set the gearing for direct drive.

37. A power transmission mechanism for an automobile having an accelerator pedal for controlling the throttle of the engine, comprising driving and driven elements, gearing interposed between said elements and having gear elements providing respectively different gear changes, a member having means for operating it to connect one or another of said gear elements to the driven element, torque transmitting means between the driving element and the gearing having means for controlling the torque transmitted thereby, and means operable by the accelerator pedal for controlling the operation of said connecting member, and means controlled by the accelerator pedal for operating said torque controlling means to interrupt the transmission of torque to the gearing.

38. A power transmission mechanism according to claim 37, wherein said torque transmitting means comprises hydraulic means for circulating a torque transmitting liquid, and said torque controlling means comprises valves controlling the circulation of such liquid, and wherein said means operable to interrupt the torque comprises a member operable by movement of the accelerator pedal to or beyond its closed throttle position to open said valves.

39. In a power transmission mechanism, gearing comprising a pair of adjacent gear elements having opposing coaxial clutch faces, and gearing connecting them for relative rotation, one of said gear elements having an axially offset axially slotted hub, a driving clutch member mounted between the gear elements to shift axially within said gear hub and to engage the clutch face of one or the other of the gear elements for driving one or the other gear element, a shifting collar exteriorly of said hub and movable axially thereof, means extending through the slotted hub and connecting said clutch member collar, and a shifting fork connected to said collar, and means shiftable axially within one of the gear elements and connected to said clutch member for shifting it.

40. In a power transmission mechanism, gearing having gear elements providing different gear changes, comprising planetary gearing having a pinion carrier and an internal gear coaxial and cooperative therewith and having an axially offset slotted hub, said pinion carrier and internal gear having opposed coaxial clutch faces, a clutch member mounted within said hub to shift axially therein to engage one or the other of the clutch faces, means within and connected to said clutch member for driving it, a shifting collar mounted exteriorly of said hub, and connected to said clutch member, a shifting fork cooperative with said collar, and means mounted centrally within and shiftable axially of the planetary gearing and connected to said clutch member for shifting it.

41. In a power transmission mechanism, gearing comprising gear elements providing different gear changes, including planetary gearing embodying an internal gear having an axially offset slotted hub, and a pinion carrier having pinions engaging said internal gear, said pinion carrier and internal gear having opposed coaxial clutch faces, a clutch member mounted within said gear hub and shiftable axially to engage one or the other of said clutch faces, a driving shaft within and connected to said clutch member for driving it, a shaft within said clutch member and driving shaft and carrying a pin extending through the driving shaft and connected to said member for shifting it, a shifting collar mounted on the exterior of said gear hub and shiftable axially thereon, screws extending through said collar and the slotted hub into said clutch member in alinement with the respective ends of said pin to connect said clutch member to said collar for shifting thereby and for removably retaining said pin in said collar, and means exteriorly of said gear hub and cooperative with said collar for shifting it.

42. A hydraulic power transmission mechanism for a motor vehicle having an engine controlled by a throttle operated by an accelerator pedal, comprising driving and driven shafts, hydraulic torque transmitting means comprising a casing containing fluid and means for circulating the fluid in the casing to transmit torque from the driving to the driven shaft at infinitely varying speed ratios from approximately zero speed to approximately the speed of the driving shaft, means for supplying fluid to and discharging it from the casing of the torque transmitting means, a gear set having a plurality of forward gear ranges, a reverse and a neutral condition, the torque transmitted to the gear set while set for a selected gear range being variable by the torque transmitting means infinitely from approximately zero speed to approximately the speed of the driving shaft, fluid pressure means operative to effect a gear range change in the gear set, valve means operable to supply fluid to said fluid pressure means to effect a gear range change in the gear set, controlling means responsive to operation of the accelerator pedal when pressed beyond full open throttle position for operating said valve means to cause operation of said fluid pressure means and thereby effect a gear range change in said gear set, and means responsive to the speed of the driven shaft and modified by the means responsive to operation of the accelerator pedal for operating the controlling means for said valve means to effect a speed range change in the gear set, manual means operable to select a forward or reverse change in the gear set, and means responsive to the speed of the driven shaft and conditioned by said manual selecting means for selecting different forward gear ranges automatically, said manual selecting means being also operable independently of the automatic means to select a forward or reverse change in the gear set.

43. A hydraulic power transmission mechanism as defined in claim 42, wherein said valve means diverts fluid from the fluid circulating through said torque transmitting means.

44. A hydraulic power transmission mechanism as defined in claim 42, wherein said gear set comprises a single planetary gear set in a fixed axial position relatively to the driven shaft and having a single ring gear and gearing and brake means cooperative with said single ring gear to provide a plurality of forward speed ratios, a reverse and neutral.

45. A hydraulic power transmission mechanism as defined in claim 42, wherein said controlling means responsive to operation of the accelerator pedal is rendered operative by movement of the accelerator pedal beyond full open throttle position to effect a speed ratio change in the gear set from a higher to a lower speed ratio, and said means responsive to the speed of the driven shaft is operative to return the transmission from a lower to a higher speed ratio.

46. A hydraulic power transmission mechanism as defined in claim 42, wherein the means for varying the torque to the selected gear range varies the torque infinitely from approximately zero speed to approximately the speed of the driving shaft and subsequently stops the circulation of fluid in said hydraulic torque transmitting means.

47. A hydraulic power transmission mechanism as defined in claim 42, wherein the driving and driven shafts are connected for direct drive and coincidently fluid circulation in said torque transmitting means is stopped.

48. A hydraulic power transmission mechanism as defined in claim 42, including braking means for the driven shaft, and a controlling element operable manually to act on said valve means and braking means to place the transmission in a neutral condition and subsequently to apply the braking means to the driven shaft to restrict or lock it from rotation and thereby apply a brake action to the motor vehicle.

49. A hydraulic power transmission mechanism as defined in claim 42, wherein said means responsive to the speed of the driven shaft is operative at a predetermined accelerating speed to operate the valve means controlling the fluid pressure means to establish a direct drive connection and to subsequently stop the fluid circulation in said hydraulic torque transmitting means, and at a predetermined decelerating speed to again start the fluid circulation in the hydraulic torque transmitting means and interrupt the direct drive connection and to connect the driving and driven shafts through the circulation of fluid in said hydraulic torque transmitting means.

50. A hydraulic power transmission mechanism as defined in claim 42, including manually operable means to directly effect at will a gear range change in the gear set or to connect the driving and driven shafts for direct drive, or neutral.

51. A hydraulic power transmission mechanism as defined in claim 42, including means rendered operative by movement of the accelerator pedal beyond a full open throttle position to discontinue the direct driving relation between the driving and driven shafts and to establish a drive from the driving shaft through the circulation of fluid in said hydraulic torque transmitting means to the driven shaft.

52. A hydraulic power transmission mechanism as defined in claim 42, including means operable by the accelerator pedal at will to override said means responsive to the speed of the driven shaft to effect a speed ratio change in the transmission mechanism.

53. A hydraulic power transmission mechanism as defined in claim 42, including a reservoir containing fluid, and wherein said fluid is circulated from said reservoir to said hydraulic torque transmitting means and is returned to said reservoir.

54. A power transmission mechanism for a motor vehicle having an engine controlled by a fuel control element, comprising driving and driven elements, hydraulic torque transmitting means between the driving and driven elements, a plurality of valves for controlling the transmission of torque between the driving and driven elements at variable speed ratios by the torque transmitting means from approximately zero speed to direct drive, a governor responsive to the speed of rotation of the driven element and acting on said valves to move them simultaneously toward closed position and thereby vary the amount of torque transmitted by the hydraulic torque transmitting means and to close said valves simultaneously and thereby produce direct drive between the driving and driven elements, a governor responsive to the speed of rotation of the driving element and operable on said valves in opposition to the first-mentioned governor to move said valves simultaneously toward open position and thereby vary the amount of torque transmitted by the torque transmitting means, and means operable by the fuel control element to act on said valves to move said valves simultaneously toward open position and thereby over-ride said governors and vary the amount of torque transmitted by the torque transmitting means.

55. A power transmission mechanism for a motor vehicle having an engine controlled by a fuel control element, comprising driving and driven elements, hydraulic torque transmitting means interposed between the driving and driven elements, a plurality of valves for controlling the amount of torque transmitted between the driving and driven elements by the torque transmitting means, governing means responsive to the speed of rotation of the driving element and acting on said valves to open them simultaneously and thereby reduce the torque transmitted between the driving and driven elements by the hydraulic torque transmitting means, governing means responsive to the speed of rotation of the driven element and acting on said valves in opposition to the first-mentioned governing means to simultaneously close said valves and thereby increase the torque transmitted between the driving and driven elements by the hydraulic torque transmitting means, and means operable by the fuel control element to act on said valves in opposition to the governing means responsive to the speed of rotation of the driven element to open said valves simultaneously and thereby interrupt transmission of torque through the torque transmitting means.

56. A power transmission mechanism for a motor vehicle having an engine controlled by a throttle control element, comprising driving and driven elements, hydraulic torque transmitting means interposed between the driving and driven elements, a master governor responsive to the speed of rotation of the driven element, an auxiliary governor responsive to the speed of rotation of the driving element, a plurality of valves, means controlled conjointly by said governors to open and close said valves simultaneously and thereby vary the amount of torque transmitted between the driving and driven elements by the torque transmitting means, the master governor acting on said valves to close them simultaneously in opposition to the action of the auxiliary governor, and means operable by movement of said throttle control element beyond full open throttle position to move said valves simultaneously toward open condition in opposition to the action of the master governor and thereby modify the torque transmitted by the torque transmitting means.

57. A power transmission mechanism for a motor vehicle having an engine for driving it and throttle control means for the engine, comprising driving and driven elements, hydraulic torque transmitting means having means for circulating fluid therein for the transmission of torque between the driving and driven elements, a plurality of valves controlling the circulation of fluid in the torque transmitting means for the transmission torque at variable speed ratios from the driving element to the driven element, a governor responsive to the speed of rotation of the driven element and operative upon said valves to close them simultaneously and thereby to increase the amount of torque transmitted by the torque transmitting means to the driven element, and means operable by said throttle control means for opposing the action of said governor on said valves and for partially opening said valves simultaneously to thereby effect the transmission of a relatively reduced amount of torque by the torque transmitting means to the driven element.

58. A power transmission mechanism for an automobile having an engine for driving it and throttle control means for the engine, comprising driving and driven elements, hydraulic means interposed between said elements and having a plurality of valves for controlling the transmission of torque from the driving element at variable speed ratios through said hydraulic means to the driven element, means operative to move said valves simultaneously toward closed position for transmission of a limited amount of torque by said hydraulic means to the driven element, a governor responsive to the speed of rotation of the driving element and operative upon said valves to move them simultaneously toward open position to thereby reduce the amount of torque transmitted by said hydraulic means to the driven element, a second governor responsive to the speed of rotation of the driven element and operative to exert a force upon said valves sufficient to overcome the influence thereon of said first-mentioned governor to move said valves simultaneously toward closed position and thereby relatively increase the amount of torque transmitted by said hydraulic means to the driven element, and means operable by said throttle control means for moving said valves simultaneously toward open postiion to thereby vary the amount of torque transmitted by said hydraulic means.

59. A hydraulic power transmission mechanism for a motor vehicle having an engine controlled by a throttle operated by an accelerator pedal, comprising driving and driven shafts, hydraulic torque transmitting means comprising a casing containing fluid and means for circulating the fluid in the casing to transmit torque from the driving to the driven shaft at infinitely varying speed ratios from approximately zero speed to approximately the speed of the driving shaft, means for supplying fluid to and discharging it from the casing of the torque transmitting means, a gear set having a plurality of forward gear ranges, a reverse and a neutral condition, the torque transmitted to the gear set while set for a selected gear range being variable by the torque transmitting means infinitely from approximately zero speed to approximately the speed of the driving shaft, fluid pressure means operative to effect a gear range change in the gear set, valve means operable to supply fluid to said fluid pressure means to effect a gear range change in the gear set, controlling means responsive to operation of the accelerator pedal when pressed beyond full open throttle position for operating said valve means to cause operation of said fluid pressure means and thereby effect a gear range change in said gear set, means responsive to the speed of the driven shaft and modified by the means responsive to operation of the accelerator pedal for operating the controlling means for said valve means to effect a speed range change in the gear set, manual means operable to select a forward or reverse change in the gear set, means responsive to the speed of the driven shaft and conditioned by said manual selecting means for selecting different forward gear ranges automatically, said manual selecting means being also operable independently of the automatic means to select a forward or reverse change in the gear set, and means for interrupting the driving torque through the gear set prior to a gear range selection, and for re-establishing said driving torque when the gear range selection has been completed.

EDWARD J. THURBER.

REFERENCES CITED

The following references are of record in the file of this patent:

UNITED STATES PATENTS

| Number | Name | Date |
| --- | --- | --- |
| Re. 22,718 | Carnagua | Feb. 12, 1946 |
| 1,744,132 | Vincent | Jan. 21, 1930 |
| 1,759,665 | Servon | May 20, 1930 |
| 1,839,145 | Forichon | Dec. 29, 1931 |
| 1,857,365 | Dodge | May 10, 1932 |
| 1,903,714 | Frias | Apr. 11, 1933 |
| 1,910,903 | McKone | May 23, 1933 |
| 1,961,619 | McClain | June 5, 1934 |
| 1,978,416 | Dodge | Oct. 30, 1934 |

(Other references on following page)

UNITED STATES PATENTS

| Number | Name | Date |
|---|---|---|
| 2,004,019 | Swetenham | June 4, 1935 |
| 2,120,104 | Livermore | June 7, 1938 |
| 2,134,398 | Cotterman | Oct. 25, 1938 |
| 2,135,908 | Millican | Nov. 8, 1938 |
| 2,152,039 | Giesen | Mar. 28, 1939 |
| 2,163,192 | Cotterman | June 20, 1939 |
| 2,222,766 | Giesen | Nov. 26, 1940 |
| 2,223,614 | Hopkins | Dec. 3, 1940 |
| 2,223,716 | Bojesen | Dec. 3, 1940 |
| 2,248,492 | Cotterman | July 8, 1941 |
| 2,302,714 | Pollard | Nov. 24, 1942 |
| 2,327,214 | Pollard | Aug. 17, 1943 |
| 2,371,228 | Dodge | Mar. 18, 1945 |
| 2,388,455 | White | Nov. 6, 1945 |